United States Patent
Sugizaki et al.

(10) Patent No.: US 9,436,613 B2
(45) Date of Patent: Sep. 6, 2016

(54) CENTRAL PROCESSING UNIT, METHOD FOR CONTROLLING CENTRAL PROCESSING UNIT, AND INFORMATION PROCESSING APPARATUS

(71) Applicant: FUJITSU LIMITED, Kawasaki-shi (JP)

(72) Inventors: Go Sugizaki, Machida (JP); Naoya Ishimura, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 319 days.

(21) Appl. No.: 13/742,472

(22) Filed: Jan. 16, 2013

(65) Prior Publication Data
US 2013/0262782 A1 Oct. 3, 2013

(30) Foreign Application Priority Data
Mar. 29, 2012 (JP) ................................ 2012-077850

(51) Int. Cl.
G06F 12/08 (2016.01)

(52) U.S. Cl.
CPC ....... *G06F 12/0891* (2013.01); *G06F 12/0826* (2013.01)

(58) Field of Classification Search
CPC .......... G06F 12/0817; G06F 12/0828; G06F 2212/2542; G06F 12/084; G06F 12/0808
USPC .................................................. 711/141–144
See application file for complete search history.

(56) References Cited

U.S. PATENT DOCUMENTS

| | | | |
|---|---|---|---|
| 5,537,569 A | 7/1996 | Masubuchi | |
| 6,295,598 B1* | 9/2001 | Bertoni | G06F 9/30 712/28 |
| 6,782,410 B1* | 8/2004 | Bhagat | G06F 9/5027 709/201 |
| 7,017,011 B2* | 3/2006 | Lesmanne | G06F 12/082 711/141 |
| 8,990,527 B1* | 3/2015 | Linstead | G06F 3/0617 711/161 |
| 2004/0068621 A1* | 4/2004 | Van Doren | G06F 12/0828 711/144 |
| 2010/0125712 A1* | 5/2010 | Murase | G06F 11/1458 711/162 |
| 2010/0332780 A1* | 12/2010 | Furuya | G06F 3/0689 711/162 |
| 2011/0202735 A1* | 8/2011 | Kono | G06F 11/1451 711/162 |

FOREIGN PATENT DOCUMENTS

| | | |
|---|---|---|
| JP | 6-259384 A | 9/1994 |
| JP | 2002-519785 A | 7/2002 |
| JP | 2002-304328 | 10/2002 |

OTHER PUBLICATIONS

Japanese Office Action mailed Sep. 15, 2015 for corresponding Japanese Patent Application No. 2012-077850, with Partial English Translation, 4 pages.

* cited by examiner

*Primary Examiner* — Yaima Rigol
*Assistant Examiner* — Mohamed Gebril
(74) *Attorney, Agent, or Firm* — Fujitsu Patent Center

(57) ABSTRACT

A central processing unit, connected to a main memory among a plurality of central processing units each including a cache memory, includes a control unit. The control unit executes a process including: classifying the plurality of central processing units into a smaller number than a total number of the plurality of central processing units, and writing to the main memory presence information indicating whether or not the same data as data stored in the main memory is held in a cache memory included in any of the central processing units that belong to a corresponding central processing unit group, for each central processing unit group of a plurality of central processing unit groups obtained by the classifying.

6 Claims, 18 Drawing Sheets

FIG.7

| CYCLE | DIMM #0 | | | | | | | | |
|---|---|---|---|---|---|---|---|---|---|
| | 0 | 1 | 2 | 3 | 4 | 5 | 6 | 7 | 8 |
| 1 | BYTE #000-007 | | | | | | | | ECC #0 [7:0] |
| 2 | BYTE #016-023 | | | | | | | | ECC #1 [7:0] |
| 3 | BYTE #032-039 | | | | | | | | ECC #2 [7:0] |
| ... | ... | | | | | | | | |
| 5 | BYTE #080-087 | | | | | | | | ECC #5 [7:0] |
| 6 | BYTE #096-103 | | | | | | | | ECC #6 [7:0] |
| 7 | BYTE #112-119 | | | | | | | | ECC #7 [7:0] |

| DIMM #1 | | | | | | | | | |
|---|---|---|---|---|---|---|---|---|---|
| 0 | 1 | 2 | 3 | 4 | 5 | 6 | 7 | 8 | |
| BYTE #008-015 | | | | | | | | ECC #0 [11:8] | DIR [3:0] |
| BYTE #024-031 | | | | | | | | ECC #1 [11:8] | DIR [7:4] |
| BYTE #040-047 | | | | | | | | ECC #2 [11:8] | DIR [11:8] |
| ... | | | | | | | | | ... |
| BYTE #088-095 | | | | | | | | ECC #5 [11:8] | DIR [23:20] |
| BYTE #104-111 | | | | | | | | ECC #6 [11:8] | DIR [27:24] |
| BYTE #120-127 | | | | | | | | ECC #7 [11:8] | DIR [31:28] |

FIG.8

| STATE | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| R-INV | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| R-SH | 1 | 0 | CPU COUNT [6:0] | | | | | | | PRESENCE BIT [15:0] | | | | | | | | | | | | | | | | ECC CHK BIT [6:0] | | | | | | |
| R-EX | 1 | 1 | CPU ID [6:0] | | | | | | | 0 | 0 | 0 | 0 | 0 | 0 | 0 | 0 | 0 | 0 | 0 | 0 | 0 | 0 | 0 | 0 | ECC CHK BIT [6:0] | | | | | | |

FIG.9

| BEFORE STATE TRANSITION | | | | AFTER STATE TRANSITION | | | | | | | | ORDER ISSUE TYPE | REQUEST RESPONSE TYPE | |
|---|---|---|---|---|---|---|---|---|---|---|---|---|---|---|
| DIR-ST | CACHE-ST | | | DIR-ST | CACHE-ST | | | PRC-BIT | | CNT | | H→LR | H→L | R→L |
| | L | H | R | | L | H | R | L | R | | | | | |
| R-INV | I | - | - | R-SH | S | I | I | 1 | - | 1 | - | COMPLETE RESPONSE WITH DATA | - |
| | I | S | - | R-SH | S | S | I | 1 | - | 1 | - | COMPLETE RESPONSE WITH DATA | - |
| | I | E | - | R-SH | S | S | I | 1 | - | 1 | - | COMPLETE RESPONSE WITH DATA | - |
| | I | M | - | R-SH | S | S | I | 1 | - | 1 | - | COMPLETE RESPONSE WITH DATA | - |
| R-SH | S | I | S | R-SH | S | I | S | 1 | - | +1 | - | COMPLETE RESPONSE WITH DATA | - |
| | S | S | S | R-SH | S | S | S | 1 | - | +1 | - | COMPLETE RESPONSE WITH DATA | - |
| | S | I/S | I/S | ///// | ///// | ///// | ///// | ///// | ///// | ///// | - | (PROTOCOL ERROR) | - |
| R-EX | E | - | E | R-SH | S | I | S | 1 | - | 2 | R:MB-IF | COMPLETE RESPONSE | DATA RESPONSE |
| | M | - | M | R-SH | S | I | S | 1 | - | 2 | R:MB-IF | COMPLETE RESPONSE | DATA RESPONSE |
| | E | - | - | ///// | ///// | ///// | ///// | ///// | ///// | ///// | - | (PROTOCOL ERROR) | - |
| | M | - | - | ///// | ///// | ///// | ///// | ///// | ///// | ///// | - | (PROTOCOL ERROR) | - |
| ACCESS EXCEPTION | | | | | | | | | | | | EXCEPTION RESPONSE | | |

FIG.10

| BEFORE STATE TRANSITION | | | | AFTER STATE TRANSITION | | | | | | | ORDER ISSUE TYPE | REQUEST RESPONSE TYPE | |
|---|---|---|---|---|---|---|---|---|---|---|---|---|---|
| DIR-ST | CACHE-ST | | | DIR-ST | CACHE-ST | | | PRC-BIT | | CNT | | H→L | R→L |
| | L | H | R | | L | H | R | L | R | | H→LR | | |
| R-INV | – | – | – | R-EX | E | – | – | ///// | ///// | ///// | – | COMPLETE RESPONSE WITH DATA | – |
| | – | S | – | R-EX | E | – | – | ///// | ///// | ///// | – | COMPLETE RESPONSE WITH DATA | – |
| | – | E | – | R-EX | E | – | – | ///// | ///// | ///// | – | COMPLETE RESPONSE WITH DATA | – |
| | – | M | – | R-EX | E | – | – | ///// | ///// | ///// | – | COMPLETE RESPONSE WITH DATA | – |
| R-SH | – | – | S | R-EX | E | – | – | ///// | ///// | ///// | R:BI | COMPLETE RESPONSE WITH DATA | – |
| | – | S | S | R-EX | E | – | – | ///// | ///// | ///// | R:BI | COMPLETE RESPONSE WITH DATA | – |
| | S | I/S | I/S | R-EX | E | – | – | ///// | ///// | ///// | R:BI | BTC PERMISSION RESPONSE | – |
| R-EX | – | – | E | R-EX | E | – | – | ///// | ///// | ///// | R:MB-EX | COMPLETE RESPONSE | DATA RESPONSE |
| | – | – | M | R-EX | E | – | – | ///// | ///// | ///// | R:MB-EX | COMPLETE RESPONSE | DATA RESPONSE |
| | E | – | – | ///// | ///// | ///// | ///// | ///// | ///// | ///// | – | (PROTOCOL ERROR) | – |
| | M | – | – | ///// | ///// | ///// | ///// | ///// | ///// | ///// | – | (PROTOCOL ERROR) | – |
| ACCESS EXCEPTION | | | | | | | | | | | – | EXCEPTION RESPONSE | – |

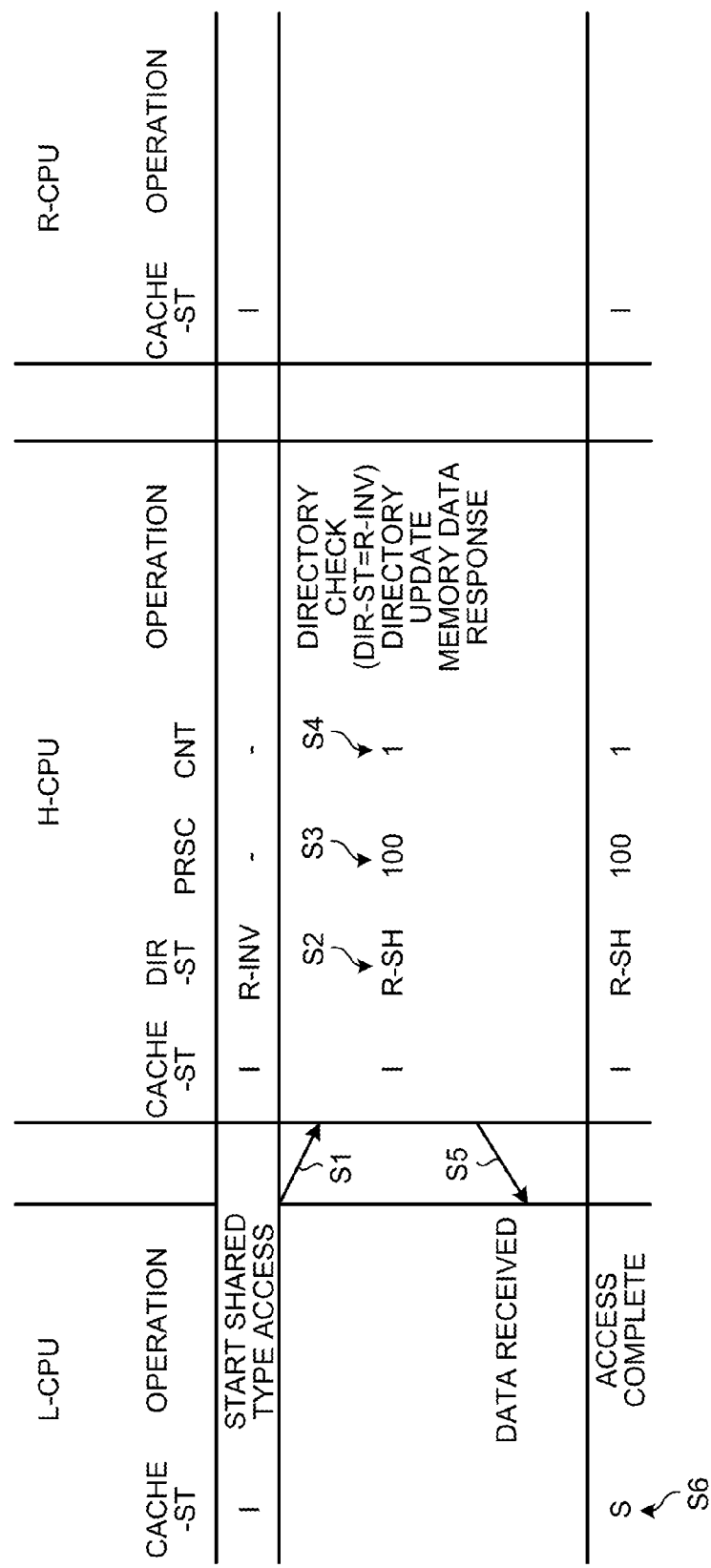

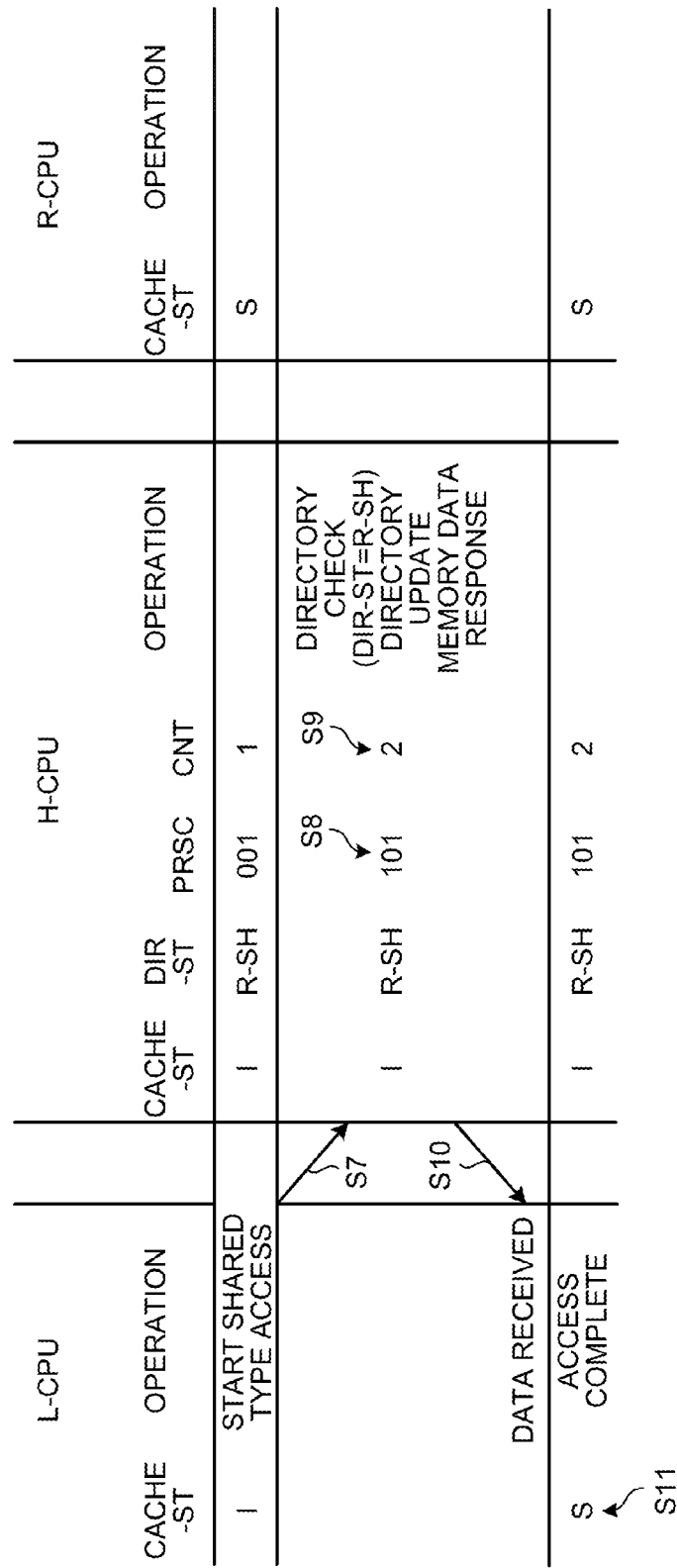

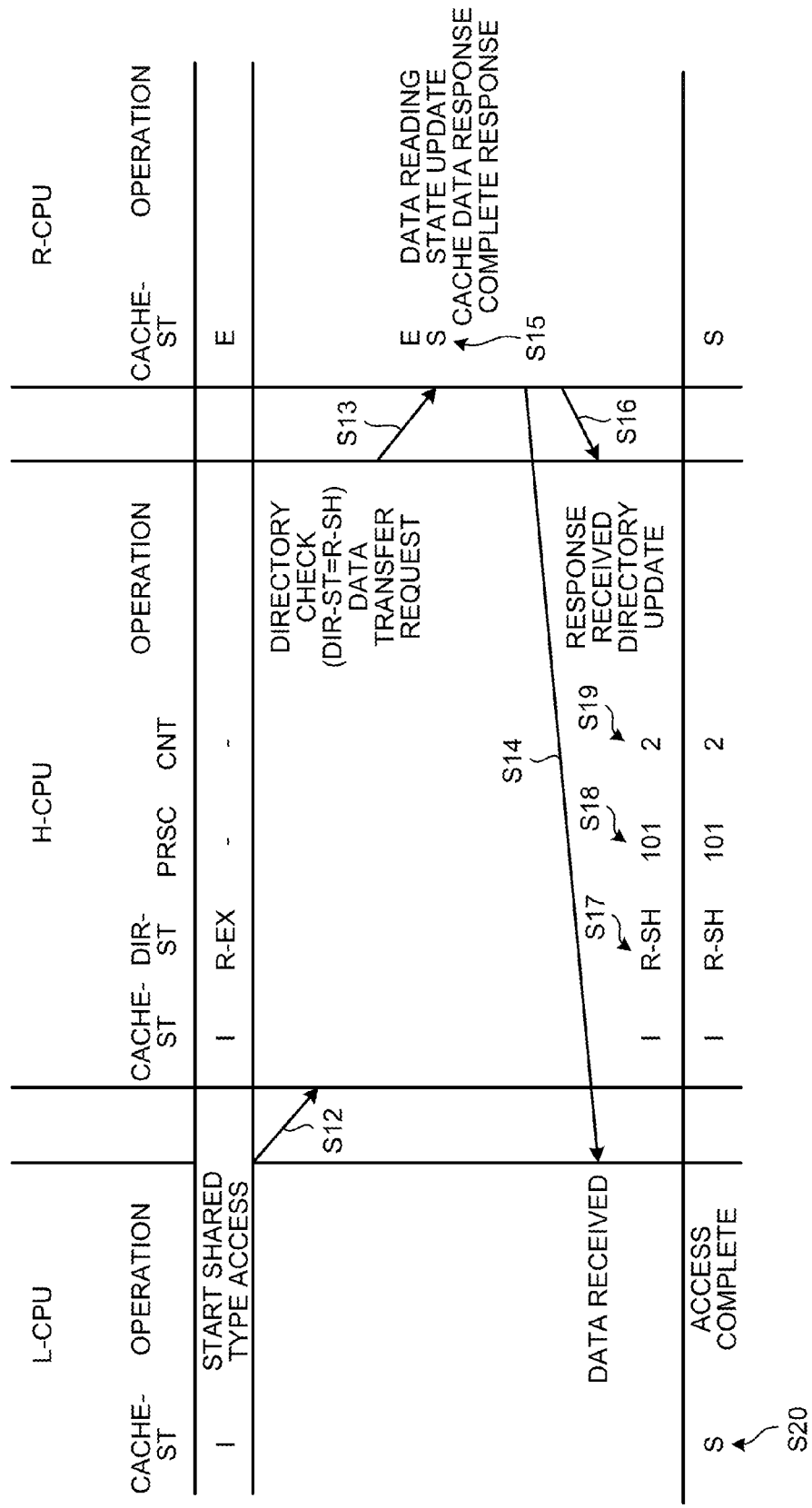

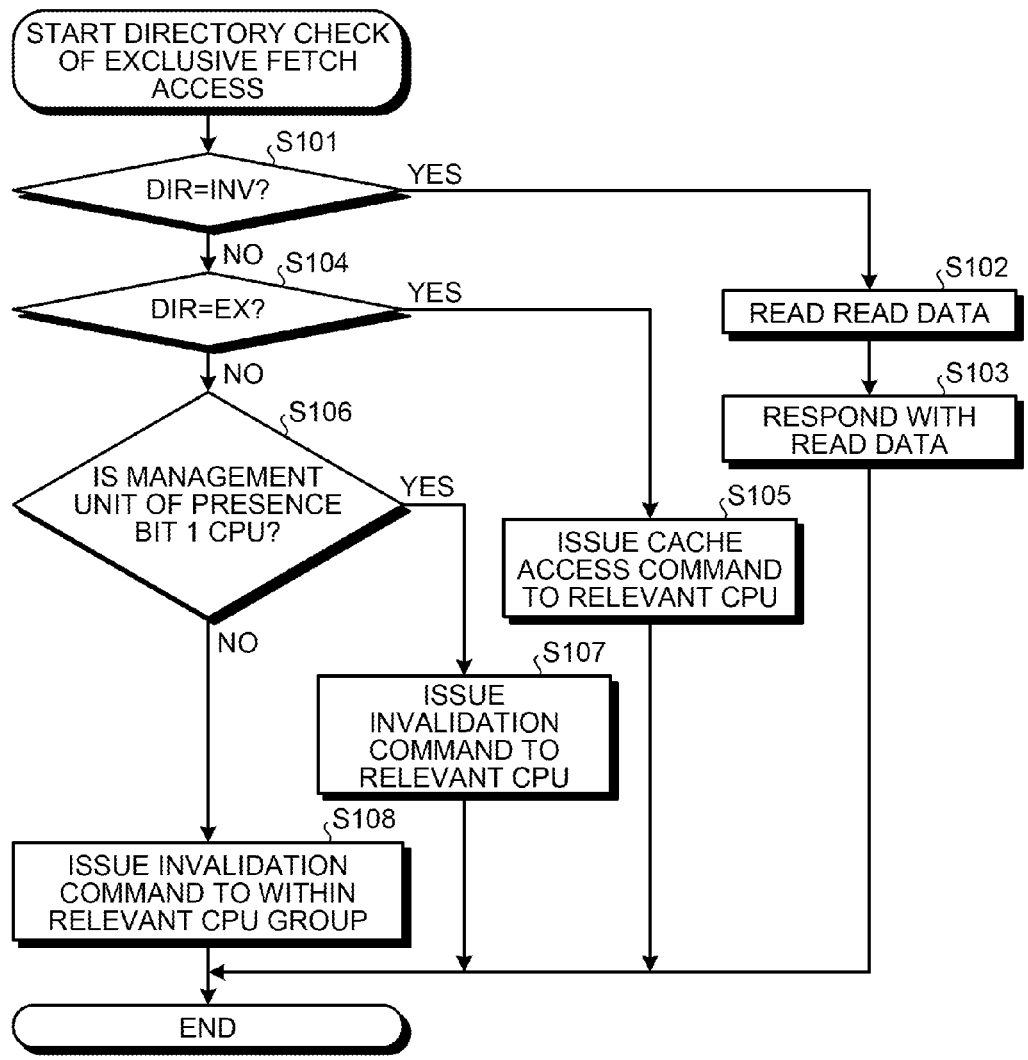

CENTRAL PROCESSING UNIT, METHOD FOR CONTROLLING CENTRAL PROCESSING UNIT, AND INFORMATION PROCESSING APPARATUS

CROSS-REFERENCE TO RELATED APPLICATION

This application is based upon and claims the benefit of priority of the prior Japanese Patent Application No. 2012-077850, filed on Mar. 29, 2012, the entire contents of which are incorporated herein by reference.

FIELD

The embodiments discussed herein are related to a central processing unit, a method for controlling a central processing unit, and an information processing apparatus.

BACKGROUND

An information processing apparatus, such as a server, that uses a technology of NUMA (Non-Uniform Memory Access) has conventionally been known. In an information processing apparatus using the technology of NUMA, for example, a main memory as a main storage is connected to each of a plurality of central processing units (hereinafter abbreviated to CPU (Central Processing Unit)), and each main memory is shared by the plurality of CPUs.

In an information processing apparatus using this NUMA technology, each CPU controls cache coherence so as to maintain the consistency between cache memories built into their respective CPUs in a directory-based system, for example. In the directory-based system, each CPU manages a directory state indicating the state of a directory indicating the location of each data block for each data block on local memory being main memory connected to itself.

For example, directory states indicating the states of a directory include INV (Invalid), SH (Shared), and EX (Exclusive). Here, INV indicates not to be held in a cache memory included in any other CPU, SH to be held in cache memories of other CPUs in a clean state, and EX to be held in a cache memory of a single CPU and the possibility of being dirty.

If there is a cache miss in a certain CPU, data is requested of a CPU connected to a main memory owning data where the cache miss has occurred. In the following description, a CPU of a data requestor is described as L(Local)-CPU, a CPU connected to a main memory owning the data requested due to the occurrence of the cache miss is described as H(Home)-CPU, and a main memory is simply described as "memory."

If the data of an address requested by the L-CPU is not held in a cache memory of any other processor, the H-CPU reads the data from a memory connected to itself to transfer to the requester. Moreover, concurrently with this process, the H-CPU stores a directory state indicating that a cache line of this address is held in the L-CPU in the memory connected to itself.

If an invalidation process occurs to the data brought out in a shared type in a cache protocol that manages only the above directory states, the H-CPU broadcasts an invalidation request to cache memories of all the CPUs in a system. In such a case, unnecessary data communication occurs; accordingly, the amount of communication increases.

From this point, the H-CPU may manage a presence bit indicating the location of another CPU, the presence bit being held in a cache memory that contains data brought out in a shared type other than the directory state, in other words, data shared with the CPU. If an invalidation process occurs to a certain data block, the H-CPU issues an invalidation request only to a CPU holding the data shared with the CPU on the cache memory, using the presence bit.

Patent Document 1: Japanese Laid-open Patent Publication No. 2002-304328

However, the above known technology has a problem that the amount of directory information increases with increase in the number of central processing units.

If the number of CPU nodes is increased, for example, to 128 based on recent years' performance requirements for a central processing unit, the number of bits corresponding to the number of CPU nodes is used for presence bits; accordingly, the presence bits become 128 bits and the amount of directory information increases.

SUMMARY

According to an aspect of an embodiment, a central processing unit, connected to a main memory among a plurality of central processing units each including a cache memory, includes a control unit. The control unit executes a process including: classifying the plurality of central processing units into a smaller number than a total number of the plurality of central processing units, and writing to the main memory presence information indicating whether or not the same data as data stored in the main memory is held in a cache memory included in any of the central processing units that belong to a corresponding central processing unit group, for each central processing unit group of a plurality of central processing unit groups obtained by the classifying.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a view illustrating an example of mapping of directory information on a memory;

FIG. 8 is a view illustrating an example of a format of the directory information;

FIG. 9 is a view illustrating an example of an update process of the directory information upon receipt of an instruction fetch request by the operation determination unit;

FIG. 10 is a view illustrating an example of an update process of the directory information upon receipt of an exclusive fetch request by the operation determination unit;

FIG. 11 is a view illustrating an example of processing operations upon instruction fetch access;

FIG. 12 is a view illustrating an example of processing operations upon instruction fetch access;

FIG. 13 is a view illustrating an example of processing operations upon instruction fetch access;

FIG. 19 is a flowchart for explaining a processing procedure of directory check processes of exclusive fetch access by the operation determination unit according to the first embodiment.

DESCRIPTION OF EMBODIMENTS

Preferred embodiments of the present invention will be explained with reference to accompanying drawings.

The present invention is not limited to the embodiments. It is possible to appropriately combine the embodiments without contradicting the process contents.

[a] First Embodiment

Figure 1:
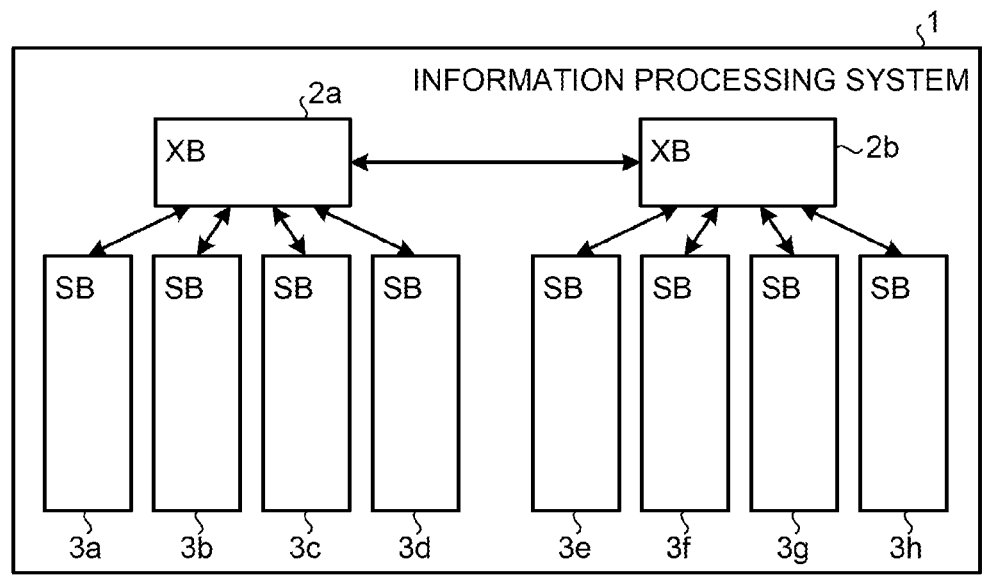
FIG. 1 is a view illustrating an example of the configuration of an information processing system according to a first embodiment.

Configuration of Information Processing System According to First Embodiment A description will be given of the configuration of an information processing system according to a first embodiment with reference to FIG. 1. FIG. 1 is a view illustrating an example of the configuration of an information processing system according to the first embodiment. As illustrating in FIG. 1, an information processing system 1 according to the first embodiment includes an XB (crossbar switch) 2a and an XB 2b as data transfer devices, and SBs (system boards) 3a to 3h as processing apparatuses. The numbers of crossbar switches and system boards, which are illustrated in FIG. 1, are simply illustrations, and are not limited to them.

The XB 2a is a switch as a data transfer device that dynamically selects a path of data to be transferred between the SBs 3a to 3h. Here, the data contains a program, an arithmetic process result, and the like. The configuration of the XB 2b is similar to that of the XB 2a; accordingly, the detailed description will be omitted. Moreover, in the following description, the XBs 2a to 2b are generalized to be referred to as a XB 2, and the description will be given as appropriate.

The SB 3a includes a CPU and a memory, and executes various arithmetic processes. The configurations of the SBs 3b to 3h are similar to that of the SB 3a; accordingly, the detailed description will be omitted. Moreover, in the following description, the SBs 3a to 3h are generalized to be referred to as a SB 3, and the description will be given.

Configuration of SB According to First Embodiment

Figure 2:
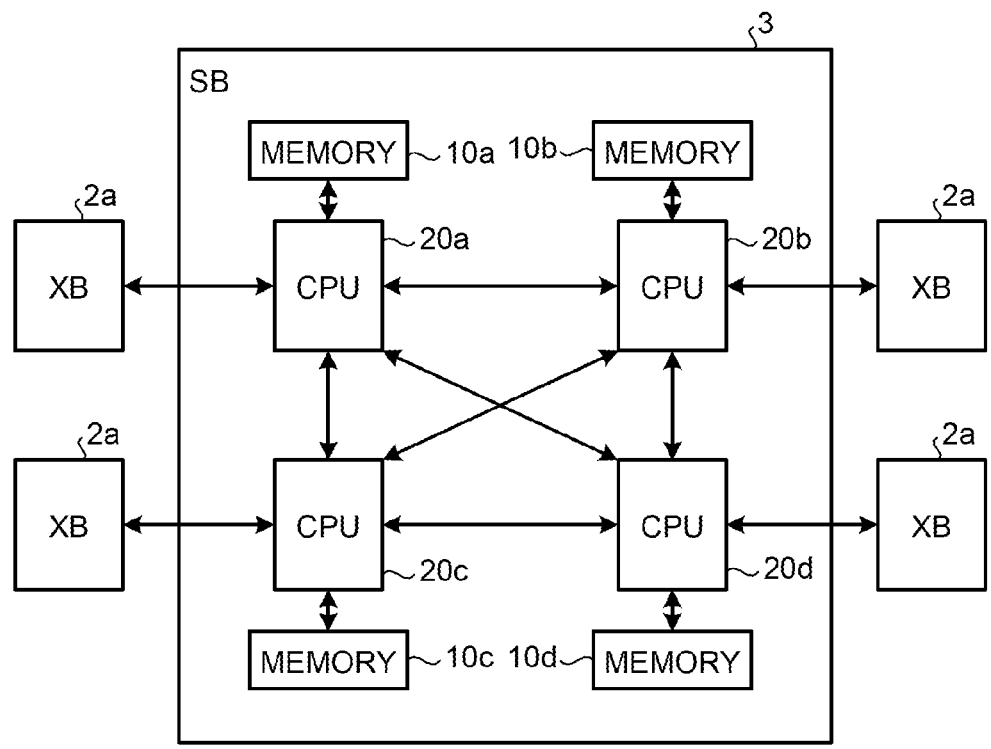
FIG. 2 is a view illustrating an example of the configuration of an SB according to the first embodiment.

Next, a description will be given of a configuration example of the SB with reference to FIG. 2. FIG. 2 is a view illustrating an example of the configuration of the SB according to the first embodiment. In the example illustrated in FIG. 2, the SB 3 includes memories 10a to 10d and CPUs 20a to 20d. The CPUs 20a to 20d are connected to each other, and are central processing units disclosed in the embodiment. Moreover, the CPUs 20a to 20d are connected to the memories 10a to 10d, respectively.

The memory 10a is, for example, RAM (Random Access Memory) that stores data. Moreover, directory information that indicates which CPU holds the data of a requested address in its cache memory is mapped on the memory 10a.

The directory information includes "R-INV (Invalid)," "R-SH (Shared)," and "R-EX (Exclusive)." Here, "R-INV" indicates that data is not held in a cache memory of any other CPU. Moreover, "R-SH" indicates that data is shared by cache memories of other CPUs in a clean state. "R-EX" indicates that data is exclusively held only in a cache memory of a single CPU, and may be dirty.

Moreover, the directory information is managed by a CPU connected to a memory containing this directory information. The directory information will be described below with reference to FIG. 8. The memories 10a to 10d have similar configurations; accordingly, in the following description, the memories 10a to 10d are generalized to be referred to as a memory 10, and the description will be given as appropriate.

The CPU 20a acquires data stored in the memory 10a being a main memory, and acquires data stored in the other memories 10b to 10d via their respective CPUs 20b to 20d. Moreover, the CPUs 20a to 20d are connected to the XBs 2a, and acquire data stored in a memory included in the SB 3 connected to the unillustrated XB 2b connected to the XB 2a. The CPU 20a then uses the data read from the memory to execute an arithmetic process. The CPUs 20a to 20d have similar configurations; accordingly, in the following description, the CPUs 20a to 20d are generalized to be referred to as a CPU 20, and the description will be given as appropriate. Moreover, the detailed configuration of the CPU 20 will be described below with reference to FIG. 3.

Moreover, in the following description, a CPU being a data requester is referred to as L(Local)-CPU, and a CPU that includes data requested by the L-CPU in its memory as H(Home)-CPU. Moreover, a CPU that owns data requested by the L-CPU is referred to as R(Remote)-CPU. Moreover, in the following description, a request that the L-CPU issues the H-CPU is described as "request" as appropriate.

Such a CPU 20 connected to the memory 10 that stores data holds a part of data in a cache memory built into itself. The CPU 20 then writes to the memory 10 the directory information containing presence information that displays the presence or absence of a CPU corresponding to a cache memory that holds the same data block of data stored in the memory 10 for every predetermined number of CPUs.

Configuration of CPU According to First Embodiment

Figure 3:
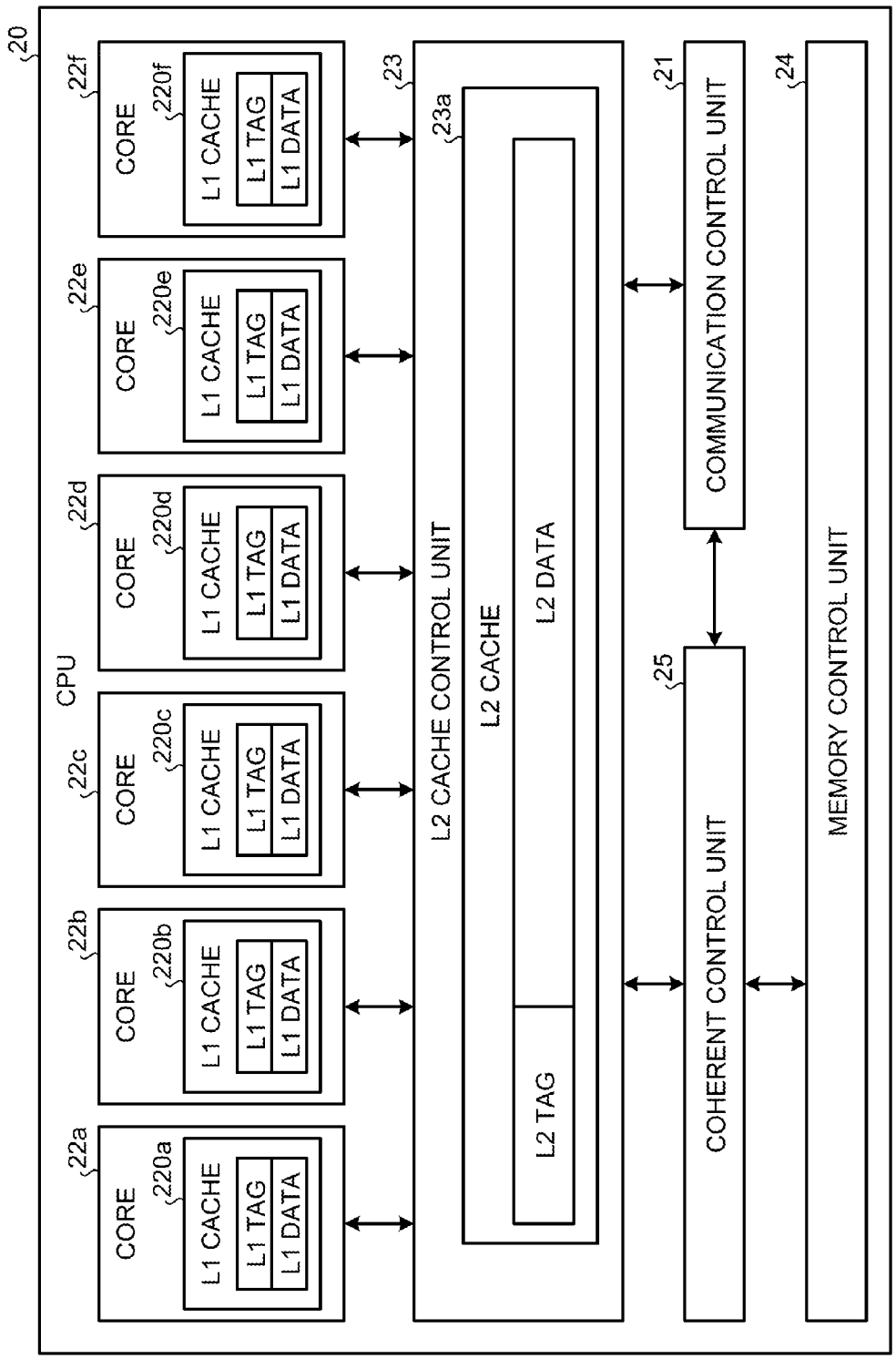
FIG. 3 is a view illustrating an example of the configuration of a CPU according to the first embodiment.

Next, a description will be given of a configuration example of the CPU with reference to FIG. 3. FIG. 3 is a view illustrating an example of the configuration of the CPU according to the first embodiment. In the example illustrated in FIG. 3, the CPU 20 includes a communication control unit 21, cores 22a to 22f, an L2 cache control unit 23, a memory control unit 24, and a coherent control unit 25. The number of cores included in the CPU 20 is not limited to the illustrated number.

The communication control unit 21 controls communication between the CPU 20, and other CPUs 20 and the XB 2. For example, the communication control unit 21 accepts a command that requests fetch access for data from the L2 cache control unit 23, and transmits the accepted command to the H-CPU. Moreover, the communication control unit 21 receives data and commands from the H-CPU and the R-CPU, and outputs the received data and commands to the L2 cache control unit 23.

Moreover, the communication control unit 21 receives from the L-CPU a command to request a read of data stored in the memory 10, and outputs the received command to the coherent control unit 25. Moreover, the communication control unit 21 transmits to another CPU the data and commands, which have been acquired from the coherent control unit 25.

The core 22a is a processor core of the CPU 20, the processor core including an L1 cache 220a, and executing various arithmetic processes using L1 data held in the L1 cache 220a. Moreover, an L1 tag indicating the state of data is added to the data held in the L1 cache 220a. The data held in the L1 cache 220a is referred to as the L1 data. Moreover, the states of the data held in the L1 cache 220a include "Invalid (I)" indicating that data is invalid, and "Shared (S)" indicating to be a shared type that data is shared with cache memories of other CPUs, and that the held data is in a clean state. Moreover, the states of cache data include "Exclusive (E)" indicating to be an exclusive type that is indicative of an exclusive state where data is not held in a cache memory of any other CPU, and that the held data is in a clean state, and "Modified (M)" indicating to be an exclusive type that is indicative of an exclusive state where data is not held in a cache memory of any other CPU, and that the held data is in a dirty state. In the following description, the state of cache data is described as the "cache state" as appropriate.

Moreover, if a cache miss occurs since data is not held in the L1 cache, the core 22a requests the cache miss data from the L2 cache control unit 23. The configurations of the cores 22a to 22f are similar; accordingly, the detailed description will be omitted. Moreover, in the following description, the cores 22a to 22f are generalized to be referred to as a core 22, and the description will be given as appropriate. Moreover, similarly, the configurations of L1 caches 220b to 220f included in their respective cores 22b to 22f are similar to that of the L1 cache 220a; accordingly, the detailed description will be omitted. Moreover, in the following description, the L1 caches 220a to 220f are generalized to be referred to as the L1 cache 220, and the description will be given as appropriate.

The L2 cache control unit 23 includes an L2 cache 23a, and executes the control of the L2 cache 23a, and the coherent control of the L1 caches 220 between the cores. Here, an L2 tag indicating the state of each cache data is added to the data held in the L2 cache 23a. The data held in the L2 cache 23a is referred to as the L2 data. Moreover, the state of the data held in the L2 cache 23a is any one of "I", "S", "E", and "M" similarly to the data held in the L1 cache 220.

For example, if data is requested from the core 22, the L2 cache control unit 23 searches the L2 cache, and determines whether or not the requested data is held. Here, if determining that the requested data is held in the L2 cache, the L2 cache control unit 23 outputs the requested data to the core 22.

Moreover, if determining that the requested data is not held in the L2 cache, the L2 cache control unit 23 determines which CPU is the H-CPU connected to a memory that stores the data requested due to the occurrence of the cache miss. The L2 cache control unit 23 refers to an address map included in the CPU 20, and identifies a CPU associated with a memory address of the requested data. The address map associates and stores a memory address of data being an access target, and information uniquely indicating a CPU that accesses a memory area indicated by the memory address.

Here, if determining that its own unit is the H-CPU, the L2 cache control unit 23 requests the coherent control unit 25 to read the data requested due to the occurrence of the cache miss. The L2 cache control unit 23 then reads the data requested due to the occurrence of the cache miss from the memory including the requested data via the coherent control unit 25 to hold in the L2 cache.

Moreover, if determining that another CPU other than the CPU including itself is the H-CPU, the L2 cache control unit 23 requests the H-CPU to transfer the data via the communication control unit 21. The L2 cache control unit 23 then receives the data from the H-CPU or R-CPU via the communication control unit 21 and holds the received data in the L2 cache. For example, if data being an instruction of a fetch access target is requested by the core 22, the L2 cache control unit 23 changes the cache state from "I" to "S".

Moreover, for example, if receiving a data transfer request from the H-CPU via the communication control unit 21, the L2 cache control unit 23 reads data being a transfer request target from the L2 cache, and transfers the read data to the L-CPU via the communication control unit 21.

The memory control unit 24 controls reading and writing of data from and to the memory 10 connected to the CPU including itself. For example, if directed to read data from the coherent control unit 25, the memory control unit 24 reads the target data and directory information from the memory 10 connected to its own unit to output to the coherent control unit 25. Moreover, the memory control unit 24 writes the data and the directory information, which have been accepted from the coherent control unit 25, to the memory 10 connected to its own unit.

The coherent control unit 25 executes the coherent control of the L2 cache in between with another CPU. For example, if the L-CPU requests data stored in the memory 10 via the communication control unit 21, or if the L2 cache control unit 23 requests data, the coherent control unit 25 executes the following process. In other words, the coherent control unit 25 acquires the requested data and directory information corresponding to the requested data from the memory 10 via the memory control unit 24, and analyzes the acquired directory information. The coherent control unit 25 then outputs a direction to the L2 cache control unit 23 or the communication control unit 21 based on the analysis result.

Configuration of Coherent Control Unit According to First Embodiment

Figure 4:
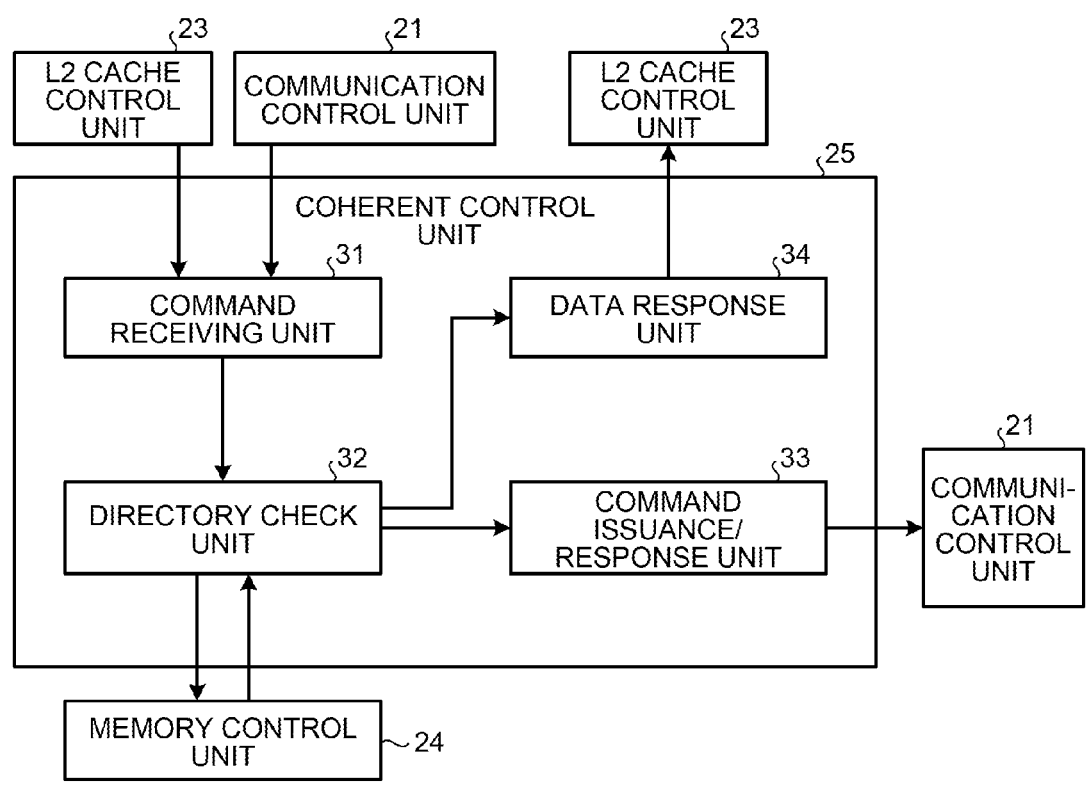
FIG. 4 is a view illustrating an example of the configuration of a coherent control unit according to the first embodiment.

Next, a description will be given of a configuration example of the coherent control unit 25 with reference to FIG. 4. FIG. 4 is a view illustrating an example of the configuration of the coherent control unit according to the first embodiment. In the example illustrated in FIG. 4, the coherent control unit 25 includes a command receiving unit 31, a directory check unit 32, a command issuance/response unit 33, and a data response unit 34.

The command receiving unit 31 receives a command such as a data read request from the L2 cache control unit 23, or another CPU via the communication control unit 21. The command receiving unit 31 then outputs the received command to the directory check unit 32.

If accepting a command such as a data read request from another CPU from the command receiving unit 31, the directory check unit 32 reads the requested data and directory information corresponding to the requested data from the memory connected via the memory control unit 24. The directory check unit 32 then checks the read directory information. Moreover, the directory check unit 32 outputs data and a command to the data response unit 34 or the command issuance/response unit 33 based on the check result. The details of the directory check unit 32 will be described below with reference to FIG. 5.

The command issuance/response unit 33 outputs the data and the command, which have been accepted from the directory check unit 32, to the communication control unit 21. The data response unit 34 outputs the data accepted from the directory check unit 32 to the L2 cache control unit 23 of the CPU including itself.

Configuration of Directory Check Unit According to First Embodiment

Figure 5:
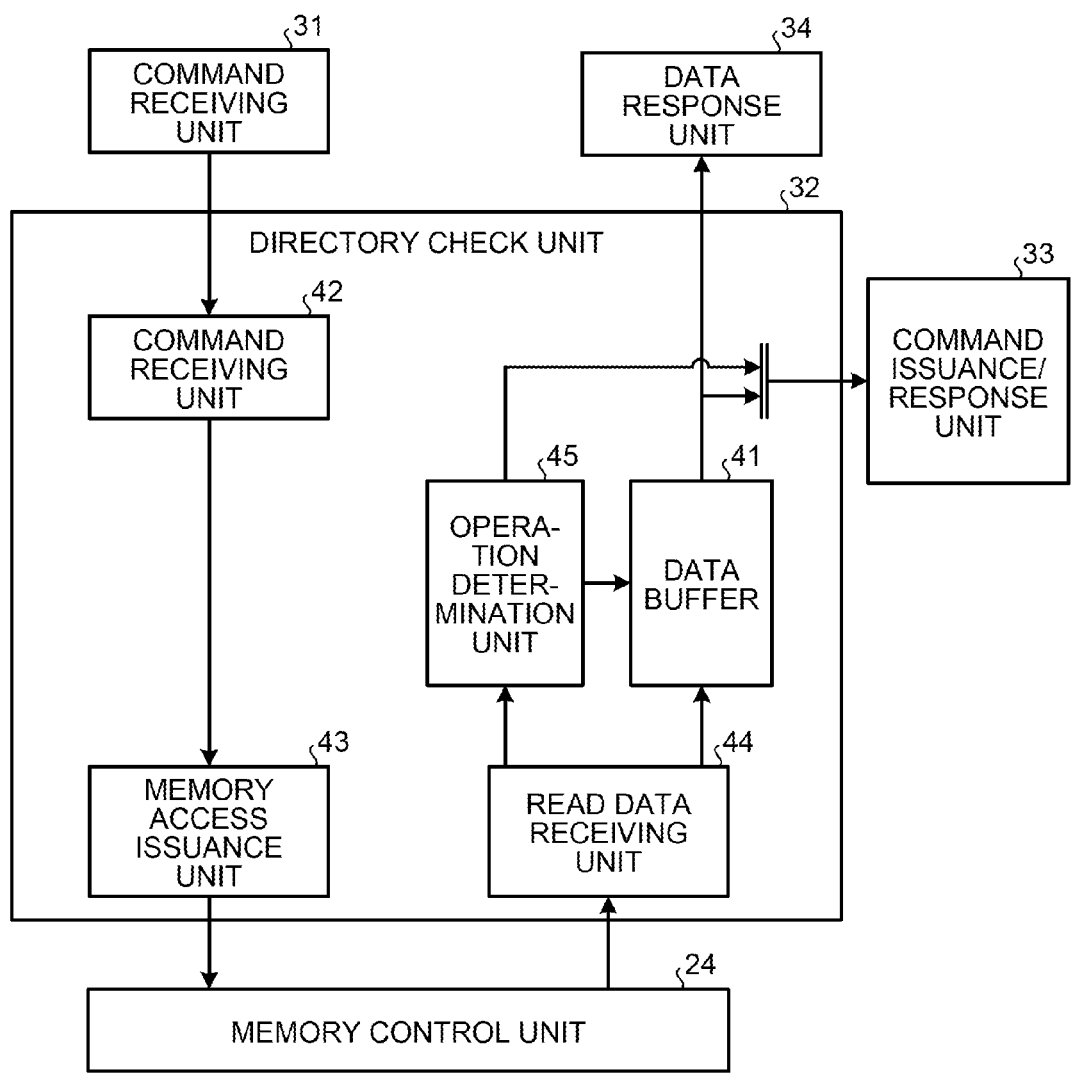
FIG. 5 is a view illustrating an example of the configuration of a directory check unit according to the first embodiment.

Next, a description will be given of a configuration example of the directory check unit 32 with reference to FIG. 5. FIG. 5 is a view illustrating an example of the configuration of the directory check unit according to the first embodiment. In the example illustrated in FIG. 5, the directory check unit 32 includes a data buffer 41, a command receiving unit 42, a memory access issuance unit 43, a read data receiving unit 44, and an operation determination unit 45.

The data buffer 41 holds the data received by the read data receiving unit 44 from the memory control unit 24. The command receiving unit 42 receives a command such as a data read request from another CPU from the command receiving unit 31, and outputs the received command such as a data read request from another CPU to the memory access issuance unit 43. The memory access issuance unit 43 issues a command to request reading of the data requested by the memory control unit 24 and directory information corresponding to the requested data based on the received command such as a data read request from another CPU. The read data receiving unit 44 receives the data requested by the memory control unit 24 and the directory information corresponding to the requested data.

The operation determination unit 45 analyzes the directory information received by the read data receiving unit 44 from the memory control unit 24, and determines what operation needs to be executed. The details of the operation determination unit 45 will be described below with reference to FIG. 6.

Configuration of Operation Determination Unit According to First Embodiment

Figure 6:
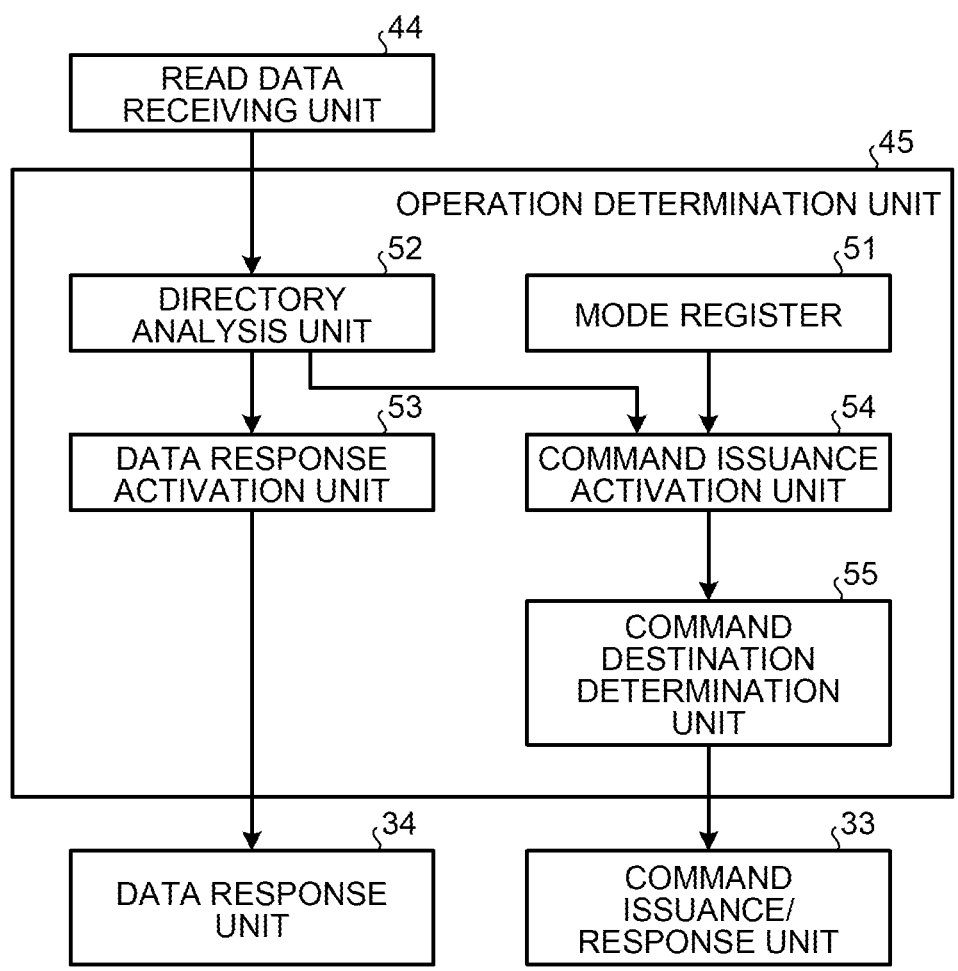
FIG. 6 is a view illustrating an example of the configuration of an operation determination unit according to the first embodiment.

Next, a description will be given of a configuration example of the operation determination unit 45 with reference to FIG. 6. FIG. 6 is a view illustrating an example of the configuration of the operation determination unit according to the first embodiment. In the example illustrated in FIG. 6, the operation determination unit 45 includes a mode register 51, a directory analysis unit 52, a data response activation unit 53, a command issuance activation unit 54, and a command destination determination unit 55.

The mode register 51 stores a management unit that indicates the number of CPUs as a unit for management of a presence bit. For example, the mode register 51 stores values such as "1" indicating that the management unit of the presence bit is per CPU, "4" indicating that the management unit of the presence bit is in units of four CPUs, and "8" indicating that the management unit of the present bit is in units of eight CPUs.

Moreover, for example, if the number of CPUs included in the information processing system is equal to 16 nodes or less, the mode register 51 stores a value, "1", indicating to be set per CPU. Moreover, for example, if the number of CPUs included in the information processing system is equal to 17 nodes or more and 64 nodes or less, the mode register 51 stores a value, "4", indicating to be set in units of four CPUs. Moreover, for example, if the number of CPUs included in the information processing system is equal to 65 nodes or more and equal to 128 nodes or less, the mode register 51 stores a value, "8", indicating to be set in units of eight CPUs.

The value stored in the mode register 51 is set based on the number of CPUs included in the information processing system 1 upon activation of the information processing system. If the number of CPUs included in the information processing system 1 increases or decreases, the value stored in the mode register 51 is reset after the information processing system 1 is rebooted.

The directory analysis unit 52 identifies the state of the directory state of the directory information, and decides a response to the L-CPU or R-CPU based on the identification result of the directory state, and the type of the request that has been made.

Moreover, the directory analysis unit 52 updates the directory information such as the directory state, the presence bit, the CPU count, and the CPU-ID. Here, the directory state is information indicating which CPU holds the data of the requested address in its cache memory. Moreover, the presence bit is information indicating the location of a CPU that shares the data of the requested address. The CPU count is information indicating the number of CPUs that share the data of the requested address. The CPU-ID is information indicating the number of a CPU that exclusively owns the data. The details of the directory information will be described below with reference to FIG. 8.

Moreover, the directory analysis unit 52 outputs the updated directory information to the memory control unit 24. As a result, the updated directory information is stored by the memory control unit 24 in the memory 10.

Moreover, the directory analysis unit 52 requests a CPU corresponding to a cache memory holding the same data block as the data to invalidate the data and respond that the data has been held, upon acceptance of exclusive fetch access. The directory analysis unit 52 then determines that the directory information is abnormal if the number of the received responses does not agree with the CPU count.

Moreover, if the read directory information is lost, the directory analysis unit 52 executes a process to restore the directory information. For example, the directory analysis unit 52 of the H-CPU requests all the CPUs in the information processing system to flush the cache. The directory analysis unit 52 of the H-CPU then receives responses from all the CPUs in the information processing system and subsequently sets the directory state to "R-INV" indicating not to be held in a cache memory of any other CPUs.

If the directory analysis unit 52 determines to respond with data read from the memory 10 based on a read request from another CPU, the data response activation unit 53 reads the data from the data buffer 41 and outputs the read data to the data response unit 34.

The command issuance activation unit 54 issues a command to process a read request from the L-CPU to the L-CPU or R-CPU based on the analysis result by the directory analysis unit 52. In the following description, a request that is issued by the H-CPU to the L-CPU or R-CPU to process a read request made by the L-CPU is described "order" as appropriate.

The command destination determination unit 55 determines the destination of an order based on the analysis of the directory information by the directory analysis unit 52.

Next, a description will be given of mapping of the directory information on the memory with reference to FIG. 7. FIG. 7 is a view illustrating an example of mapping of the directory information on the memory 10. As illustrated in FIG. 7, the memory 10 includes a DIMM (Dual Inline Memory Module) #0 and a DIMM #1.

For example, as a directory line of Cycle 1 in FIG. 7, data or a program equivalent to 8 bytes of BYTE #000 to 007 is stored in an area from byte 0 to byte 7 of the DIMM #0, respectively. Moreover, data or a program equivalent to 8 bytes of BYTE #008 to 015 is stored in an area from byte 0 to byte 7 of the DIMM #1, respectively. As ECC (Error Check and Correct) to be used to check whether or not data is correct, 8-bit ECC of ECC #0[7:0] is stored in an area of the eighth byte of the DIMM #0. Moreover, 4-bit ECC of ECC #0[11:8] and 4-bit directory information of DIR[3:0] are stored in the eighth byte of the DIMM #1.

Next, a description will be given of a format of the directory information with reference to FIG. 8. FIG. 8 is a view illustrating an example of a format of the directory information. As illustrated in FIG. 8, the directory information stores 32-bit information from bit 31 to bit 00 while associating the 32-bit information with the state of a directory. Here, in FIG. 8, the first line corresponds to the state of the directory of R-INV, the second line to R-SH, and the third line to R-EX.

If the state of the directory is R-INV, it indicates that a data block is not held in a cache memory of any other CPU. Moreover, if the state of the directory is R-SH, it indicates that a data block is shared by cache memories of other CPUs in a clean state. Moreover, if the state of the directory is R-EX, it indicates that a data block is exclusively held only in a cache memory of a single CPU and may be dirty.

Here, the field of bits 31 to 30 of the directory information are status bits of 2 bits, indicating the state of a data block. For example, stored in bits 31 to 30 are "00" indicating that the state of the directory is R-INV, "10" indicating that the state of the directory is R-SH, and "11" indicating that the state of the directory is R-EX.

Moreover, the field of bits 29 to 23 of the directory information is used in accordance with the state of the directory. For example, if the state of the directory is R-SH, bits 29 to 23 are used as a CPU count indicating the number of CPUs that share data corresponding to the directory information. Moreover, for example, if the state of the directory is R-EX, bits 29 to 23 are used as a CPU-ID indicating the number of a CPU that exclusively owns data corresponding to the directory information.

Moreover, bits 22 to 07 of the directory information are used in accordance with the state of the directory. For example, if the state of the directory is R-SH, bits 22 to 07 are used as presence bits that indicate the locations of CPUs that share data corresponding to the directory information.

The presence bit is information indicating the location of a CPU that shares data of a requested address. With regard to the presence bit, for example, if the number of CPUs included in the information processing system is equal to 16 nodes or less, one bit is allocated per CPU, in other words, to one CPU. Moreover, for example, if the number of CPUs included in the information processing system is equal to 17 nodes or more and equal to 64 nodes or less, the presence bit is set in units of four CPUs. Moreover, with regard to the presence bit, for example, if the number of CPUs included in the information processing system is equal to 65 nodes or more and equal to 128 nodes or less, one bit is allocated in units of eight CPUs, in other words, to eight CPUs.

Moreover, bits 06 to 00 of the directory information are ECC indicating whether corresponding data stored in the memory is correct.

If the state of the directory is R-INV, bits 29 to 07 are not used and treated as a don't care (Don't care). Moreover, if the state of the directory is R-EX, bits 22 to 07 are not used and treated as a don't care (Don't care).

Update Rule of Directory Information by Operation Determination Unit

Next, a description will be given of update rules of the directory information by the operation determination unit 45 with reference to FIGS. 9 and 10. Here, as examples, descriptions will be given of update rules of the directory information upon receipt of an instruction fetch request with reference to FIG. 9, and of update rules of the directory information upon receipt of an exclusive fetch access request with reference to FIG. 10.

Instruction Fetch

FIG. 9 is a view illustrating an example of an update process of the directory information upon receipt of an instruction fetch request by the operation determination unit. FIG. 9 illustrates update rules where the "directory information and the cache state (CACHE-ST) before state transition," the "directory information and the cache state (CACHE-ST) after state transition," an "order issue type," and a "request response type" are associated.

Here, the "directory information and the cache state before state transition" indicate the directory information of data being an instruction of a fetch access target, and the cache states of the L-CPU, the H-CPU and the R-CPU when the operation determination unit 45 receives instruction fetch access. Here, the "directory information before state transition" includes the directory state (DIR-ST).

Moreover, the "directory information and the cache state after state transition" indicate the result of an analysis of how the directory information and the cache state are transited in accordance with the directory information and the cache state before state transition, when the operation determination unit 45 responds to the instruction fetch access. Here, the "directory information after state transition" includes the presence bit (PRC-BIT) and the CPU count (CNT) in addition to the directory state (DIR-ST).

Moreover, the "order issue type" indicates a request that is issued by the H-CPU to the L-CPU or R-CPU to process a request made by the L-CPU. Moreover, the "request response type" indicates a response to a request that the L-CPU has made to the H-CPU and a response issued by the R-CPU to the L-CPU. In FIG. 9, "H→LR" indicates data transfer from the H-CPU to the L-CPU or R-CPU. Moreover, in FIG. 9, "H→L" indicates data transfer from the H-CPU to the L-CPU, and "R→L" indicates data transfer from the R-CPU to the L-CPU.".

In FIG. 9, a description will be given, as a specific example, of the case where the directory state is "R-INV" indicating not to be held in a cache memory of any other CPU, and all the cache states of the L-CPU, the H-CPU and the R-CPU are "I" indicating that the data held in the L2 cache 23a is invalid.

For example, since the "directory state" is "R-INV" indicating not to be held in a cache memory of any other CPU, if the directory analysis unit 52 receives instruction fetch access, the operation determination unit 45 reads the cache state from the L2 cache control unit 23 of a CPU including itself. Since the cache state is "I" indicating that the data held in the L2 cache 23a is invalid, the directory analysis unit 52 determines to respond to the L-CPU with the data read from the memory 10. The directory analysis unit 52 notifies the analysis result to the data response activation unit 53 and the command issuance activation unit 54.

The data response activation unit 53 notifies the data response unit 34 that the data held in the data buffer 41 is responded to the L-CPU. Moreover, the command issuance activation unit 54 issues a complete response to the command destination determination unit 55. The command destination determination unit 55 then determines the L-CPU being the destination to transfer the complete response and outputs the complete response to the communication control unit 21. The communication control unit 21 then transfers the data held in the data buffer 41 and the complete response to the L-CPU.

Moreover, the directory analysis unit 52 sets the "directory state" to "R-SH," the "presence bit" corresponding to the L-CPU to "1", and the "CPU count" to "1".

Next, in FIG. 9, a description will be given, as a specific example, of the case where the directory state is "R-SH" indicating that data is shared by cache memories of other CPUs in a clean state, the cache states of the L-CPU and the H-CPU are "I" indicating that the data held in the L2 cache 23a is invalid, respectively, and the cache state of the R-CPU is "S" indicating to be a shared type that data is shared with cache memories of other CPUs and that the held data is in a clean state.

In this case, since the "directory state" is "R-SH" indicating that data is shared by cache memories of other CPUs in a clean state, if receiving instruction fetch access, the directory analysis unit 52 determines to respond to the L-CPU with the data read from the memory 10. Moreover, the directory analysis unit 52 keeps the "directory state" to "R-SH" indicating that data is shared by cache memories of other CPUs in a clean state while setting the "presence bit" corresponding to the L-CPU to "1", and incrementing the "CPU count" by one.

Moreover, in FIG. 9, a description will be given, as a specific example, of the case where the directory state is "R-EX" indicating that data is exclusively held only in a cache memory of a single CPU and may be dirty, the cache states of the L-CPU and the H-CPU are "I" indicating that the data held in the L2 cache 23a is invalid, respectively, and the cache state of the R-CPU is "E" indicating to be an exclusive type that is indicative of an exclusive state where data is not held in a cache memory of any other CPU and that the held data is in a clean state.

In this case, since the "directory state" is "R-EX" indicating that data is exclusively held only in the cache memory of the R-CPU and may be dirty, if receiving instruction fetch access, the directory analysis unit 52 determines to transfer the data from the R-CPU to the L-CPU. Moreover, the command issuance activation unit 54 issues a data transfer request to output to the command destination determination unit 55. The command destination determination unit 55 then determines the R-CPU being the destination and outputs a data transfer request being a request to transfer data being an instruction of a fetch access target, to the communication control unit 21. Moreover, the directory analysis unit 52 sets the "directory state" to "R-SH," the "presence bit" corresponding to the L-CPU to "1", and the "CPU count" to "2", respectively.

Exclusive Fetch

FIG. 10 is a view illustrating an example of an update process of the directory information upon receipt of an exclusive fetch request by the operation determination unit. Similarly to FIG. 9, FIG. 10 illustrates update rules where the "directory information and the cache state before state transition," the "directory information and the cache state after state transition," an "order issue type" and a "request response type" are associated.

In FIG. 10, a description will be given, as a specific example, of the case where the directory state is "R-INV" indicating not to be held in a cache memory of any other CPU, and all the cache states of the L-CPU, the H-CPU and the R-CPU indicate "I" indicating that the data held in the L2 cache 23a is invalid.

For example, since the "directory state" is "R-INV" indicating not to be held in a cache memory of any other CPU, if the directory analysis unit 52 receives exclusive fetch access, the operation determination unit 45 reads the cache state from the L2 cache control unit 23 of a CPU including itself. Since the cache state is "I" indicating that the data held in the L2 cache 23a is invalid, the directory analysis unit 52 determines to respond to the L-CPU with the data read from the memory 10. The directory analysis unit 52 notifies the analysis result to the data response activation unit 53 and the command issuance activation unit 54.

The data response activation unit 53 then notifies the data response unit 34 that the data held in the data buffer 41 is responded to the L-CPU. Moreover, the command issuance activation unit 54 issues a complete response to the command destination determination unit 55. The command destination determination unit 55 then determines the L-CPU being the destination to transfer the complete response and outputs the complete response to the communication control unit 21. The communication control unit 21 then transfers the data held in the data buffer 41 and the complete response to the L-CPU.

Moreover, the directory analysis unit 52 sets the "directory state" to "R-EX" indicating that data is exclusively held only in a cache memory of a single CPU, and may be dirty. In this case, the "CPU-ID" corresponding to the L-CPU is set, and the "presence bit" and the "CPU count" are not set.

Next, in FIG. 10, a description will be given, as a specific example, of the case where the directory state is "R-SH" indicating that data is shared by cache memories of other CPUs in a clean state, the cache states of the L-CPU and the H-CPU are "I" indicating that the data held in the L2 cache 23a is invalid, respectively, and the cache state of the R-CPU is "S" indicating to be a shared type that data is shared with cache memories of other CPUs and that the held data is in a clean state.

In this case, since the "directory state" is "R-SH" indicating that data is shared by cache memories of other CPUs in a clean state, if receiving exclusive fetch access, the directory analysis unit 52 determines to respond to the L-CPU with the data read from the memory 10. Moreover, in this case, the directory analysis unit 52 directs the R-CPU that owns the requested data to invalidate the cache state of the requested data.

Moreover, the directory analysis unit 52 sets the "directory state" to "R-EX" indicating that data is exclusively held only in a cache memory of a single CPU, and may be dirty. In this case, the "CPU-ID" corresponding to the L-CPU is set, and the "presence bit" and the "CPU count" are not set.

Moreover, in FIG. 10, a description will be given, as a specific example, of the case where the directory state is "R-EX" indicating that data is exclusively only held in a cache memory of a single CPU and may be dirty, the cache states of the L-CPU and the H-CPU are "I" indicating that the data held in the L2 cache 23*a* is invalid, respectively, and the cache state of the R-CPU is "E" indicating to be an exclusive type that is indicative of an exclusive state where data is not held in a cache memory of any other CPU and that the held data is in a clean state.

In this case, since the "directory state" is "R-EX" indicating that data is exclusively held only in the cache memory of the R-CPU and may be dirty, if receiving exclusive fetch access, the directory analysis unit 52 determines to cause the R-CPU to exclusively transfer the data to the L-CPU. Moreover, the command issuance activation unit 54 issues a data transfer request to output to the command destination determination unit 55. The command destination determination unit 55 then determines the R-CPU being the destination and outputs the data transfer request being a request to transfer target data of the exclusive fetch access to the communication control unit 21.

Moreover, the directory analysis unit 52 sets the "directory state" to "R-EX" indicating that data is exclusively held only in a cache memory of a single CPU, and may be dirty. In this case, the "CPU-ID" corresponding to the L-CPU is set, and the "presence bit" and the "CPU count" are not set.

Directory Information Update Process Operations

Next, a description will be given of processing operations by the information processing apparatus with reference to FIGS. 11 to 18. Here, descriptions will be given of processing operations upon instruction fetch access with reference to FIGS. 11 to 13, and of processing operations upon exclusive fetch access with reference to FIGS. 14 to 16. Moreover, a description will be given of processing operations of a restoration process of when the directory information is lost with reference to FIGS. 17 and 18.

Instruction Fetch Access in Case of R-INV

FIG. 11 is a view illustrating an example of processing operations upon instruction fetch access. In FIG. 11, a description will be given, as a specific example, of the case where the directory state (DIR-ST) is "R-INV" indicating that data is not held in a cache memory of any other CPU, and all the cache states (Cache-ST) of the L-CPU, the H-CPU and the R-CPU are "I" indicating that the data held in the L2 cache 23*a* is invalid.

In the example illustrated in FIG. 11, the cache state of the L-CPU is "I" indicating that the data held in the L2 cache 23*a* is invalid, and no valid data is held. Therefore, the core 22 and the L2 cache control unit 23 of the L-CPU detect a cache miss of the L2 cache 23*a*. The L2 cache control unit 23 of the L-CPU then requests instruction fetch access from the H-CPU (Step S1).

Next, since the "directory state" is "R-INV" indicating that data is not held in a cache memory of any other CPU, if the directory analysis unit 52 receives instruction fetch access from the L-CPU, the H-CPU reads the cache state from the L2 cache control unit 23. Since the cache state is "I" indicating that the data held in the L2 cache 23*a* is invalid, the directory analysis unit 52 determines to respond to the L-CPU with the data read from the memory 10.

Moreover, the directory analysis unit 52 of the H-CPU sets the "directory state" to "R-SH" indicating that data is shared by cache memories of other CPUs in a clean state (Step S2).

Moreover, the directory analysis unit 52 of the H-CPU sets the "presence bit (PRSC)" so as to indicate that the L-CPU holds data being an instruction of a fetch access target (Step S3). For example, if associating the bits of PRSC with "the L-CPU, the H-CPU and the R-CPU," the directory analysis unit 52 sets PRSC to "100" so as to indicate that the L-CPU holds the data being the instruction of the fetch access target.

Moreover, the directory analysis unit 52 of the H-CPU sets the "CPU count (CNT)" to "1" (Step S4). Consequently, the "CPU count (CNT)" indicates that one CPU includes the data being the instruction of the fetch access target.

The H-CPU then responds to the L-CPU with the data (Step S5). Moreover, the L-CPU receives the data, and updates the cache state to "S" indicating to be a shared type that data is shared by cache memories of other CPUs and the held data is in a clean state (Step S6).

Instruction Fetch Access in Case of R-SH

FIG. 12 is a view illustrating an example of processing operations upon instruction fetch access. In FIG. 12, a description will be given, as a specific example, of the case where the directory state is "R-SH" indicating that data is shared by cache memories of other CPUs in a clean state, the cache states of the L-CPU and the H-CPU are "I" indicating that the data held in the L2 cache 23*a* is invalid, respectively, and the cache state of the R-CPU is "S" indicating to be a shared type that data is shared by cache memories of other CPUs and that the held data is in a clean state.

Similarly to FIG. 11, the L-CPU requests instruction fetch access from the H-CPU (Step S7). Next, since the "directory state" is "R-SH" indicating that data is shared by cache memories of other CPUs in a clean state, if the directory analysis unit 52 receives the instruction fetch access from the L-CPU, the H-CPU determines to respond to the L-CPU with the data read from the memory 10.

Moreover, the directory analysis unit 52 of the H-CPU sets the "presence bit (PRSC)" so as to indicate that the L-CPU holds data being an instruction of a fetch access target (Step S8). For example, if associating the bits of PRSC with "the L-CPU, the H-CPU and R-CPU," the directory analysis unit 52 changes PRSC from "001" to "101." Consequently, the "presence bits (PRSC)" indicate that in addition to the R-CPU, the L-CPU also holds the data being the instruction of the fetch access target.

Moreover, the directory analysis unit 52 sets the "CPU count (CNT)" to "2" (Step S9). Consequently, the "CPU count (CNT)" indicates that the two CPUs of the R-CPU and the L-CPU share the data being the instruction of the fetch access target.

The H-CPU then responds to the L-CPU with the data (Step S10). Moreover, the L-CPU receives the data, and updates the cache state to "S" indicating to be a shared type that data is shared by cache memories of others CPU, and that the held data is in a clean state (Step S11).

Instruction Fetch Access in Case of R-EX

FIG. 13 is a view illustrating an example of processing operations upon instruction fetch access. In FIG. 13, a description will be given, as a specific example, of the case where the directory state is "R-EX" indicating that data is exclusively held only in the cache memory of the R-CPU and may be dirty, the cache states of the L-CPU and the H-CPU are "I" indicating that the data held in the L2 cache 23*a* is invalid, respectively, and the cache state of the R-CPU is "E" indicating to be an exclusive type that is indicative of an exclusive state where data is not held in a cache memory of any other CPU, and that the held data is in a clean state.

Similarly to FIG. 11, the L-CPU requests instruction fetch access from the H-CPU (Step S12). Since the "directory state" is "R-EX" indicating that data is exclusively held only in the cache memory of the R-CPU and may be dirty, if the directory analysis unit 52 receives the instruction fetch access from the L-CPU, the H-CPU determines to transfer the data from the R-CPU to the L-CPU, and transmits a data transfer request to the R-CPU (Step S13).

The R-CPU reads data being an instruction of a fetch access target from the cache memory to transfer to the L-CPU (Step S14). The R-CPU updates the cache state from "E" indicating to be an exclusive type that is indicative of an exclusive state where data is not held in a cache memory of any other CPU, and that the held data is in a clean state, to "S" indicating to be a shared type that data is shared by cache memories of other CPUs, and that the held data is in a clean state (Step S15). Moreover, the R-CPU transmits a complete response to the H-CPU (Step S16).

Moreover, the directory analysis unit 52 of the H-CPU updates the "directory state" to "R-SH" indicating that data is shared by cache memories of other CPUs in a clean state (Step S17).

Moreover, the directory analysis unit 52 of the H-CPU sets the "presence bit (PRSC)" so as to indicate that in addition to the R-CPU, the L-CPU holds the data being the instruction of the fetch access target (Step S18). For example, if the bits of PRSC are associated with "the L-CPU, the H-CPU and the R-CPU," the directory analysis unit 52 sets PRSC to "101" so as to indicate that the R-CPU and the L-CPU hold the data being the instruction of the fetch access target.

Moreover, the directory analysis unit 52 sets the "CPU count (CNT)" to "2" (Step S19). Consequently, the "CPU count (CNT)" indicates that the two CPUs of the R-CPU and the L-CPU share the data being the instruction of the fetch access target.

The L-CPU then receives the data being the instruction of the fetch access target from the R-CPU, and updates the cache state to "S" indicating to be a shared type that data is shared by cache memories of other CPUs and that the held data is in a clean state (Step S20).

Exclusive Fetch Access in Case of R-SH

Figure 14:
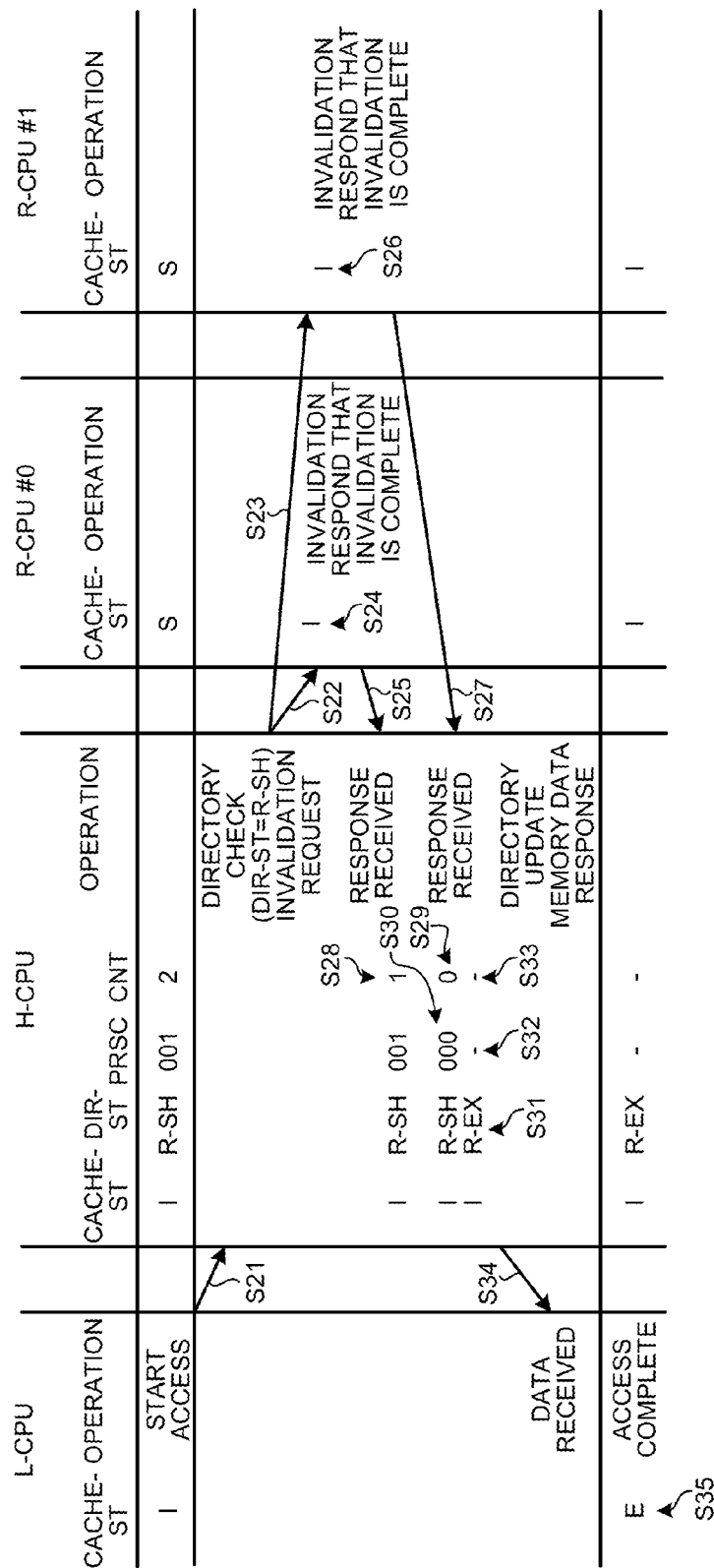
FIG. 14 is a view illustrating an example of processing operations upon exclusive fetch access.

FIG. 14 is a view illustrating an example of processing operations upon exclusive fetch access. In FIG. 14, a description will be given, as a specific example, of the case where the directory state is "R-SH" indicating that data is shared by cache memories of other CPUs in a clean state, the cache states of the L-CPU and the H-CPU are "I" indicating that the data held in the L2 cache 23a is invalid, respectively, and the cache states of R-CPUs #0 and #1 are "S" indicating to be a shared type that data is shared by cache memories of other CPUs, and that the held data is in a clean state, respectively. Here, given as an example is the case where the presence bit is managed in units of four CPUs, and the R-CPUs #0 and #1 belong to the same group as the management unit of the presence bit. Moreover, here, for convenience of description, of CPUs belonging to the same group, only the R-CPUs #0 and #1 are illustrated, and a description will be omitted of the other CPUs except the R-CPUs #0 and #1. Moreover, here, the L-CPU, the H-CPU, and the R-CPUs #0 and #1 are assumed to belong to different groups, respectively, as the management units of the presence bits.

The L-CPU requests exclusive fetch access from the H-CPU (Step S21). Next, since the "directory state" is "R-SH" indicating that data is shared by cache memories of other CPUs in a clean state, if the directory analysis unit 52 receives the exclusive fetch access, the H-CPU determines to respond to the L-CPU with the data read from the memory 10. Moreover, in this case, if the directory analysis unit 52 directs the R-CPUs #0 and #1 that own the data to invalidate the cache state of the target data of the exclusive fetch access (Steps S22 and S23).

The R-CPU #0 updates the cache state to "I" indicating that the data held in the L2 cache 23a is invalid (Step S24), and responds to the H-CPU that invalidation is complete (Step S25). Moreover, the R-CPU #1 updates the cache state to "I" indicating that the data held in the L2 cache 23a is invalid (Step S26), and responds to the H-CPU that invalidation is complete (Step S27).

Moreover, the directory analysis unit 52 receives the invalidation complete response from the R-CPU #0 and sets the "CPU count (CNT)" to "1" from "2" (Step S28). Consequently, the "CPU count (CNT)" indicates that one CPU includes the target data of the exclusive fetch access.

Moreover, the directory analysis unit 52 receives the invalidation complete response from the R-CPU #1 and sets the "CPU count (CNT)" to "0" from "1" (Step S29). Consequently, the "CPU count (CNT)" indicates that no CPU includes the target data of the exclusive fetch access.

Moreover, after receipt of the invalidation complete responses from the R-CPUs #0 and #1, the directory analysis unit 52 of the H-CPU sets the "presence bits (PRSC)" (Step S30). For example, if associating the bits of PRSC with the "groups to which the L-CPU, the H-CPU, and the R-CPUs #0 and #1 belong," the directory analysis unit 52 changes the "presence bits" from "001" to "000." Consequently, the "presence bits" indicate that the group to which the R-CPUs #0 and #1 belong does not hold the target data of the exclusive fetch access.

The H-CPU then sets the "directory state" to "R-EX" indicating that data is exclusively held only in the cache memory of the L-CPU and may be dirty (Step S31). Moreover, the H-CPU invalidates the "presence bit" and the "CPU count" (Steps S32 and S33). Next, the H-CPU responds to the L-CPU with the target data of the exclusive fetch access (Step S34).

The L-CPU receives the target data of the exclusive fetch access. The L-CPU then updates the cache state to "E" indicating to be an exclusive type that is indicative of an exclusive state where data is not held in a cache memory of any other CPU, and that the held data is in a clean state (Step S35).

Exclusive Fetch Access in Case of R-SH

Figure 15:
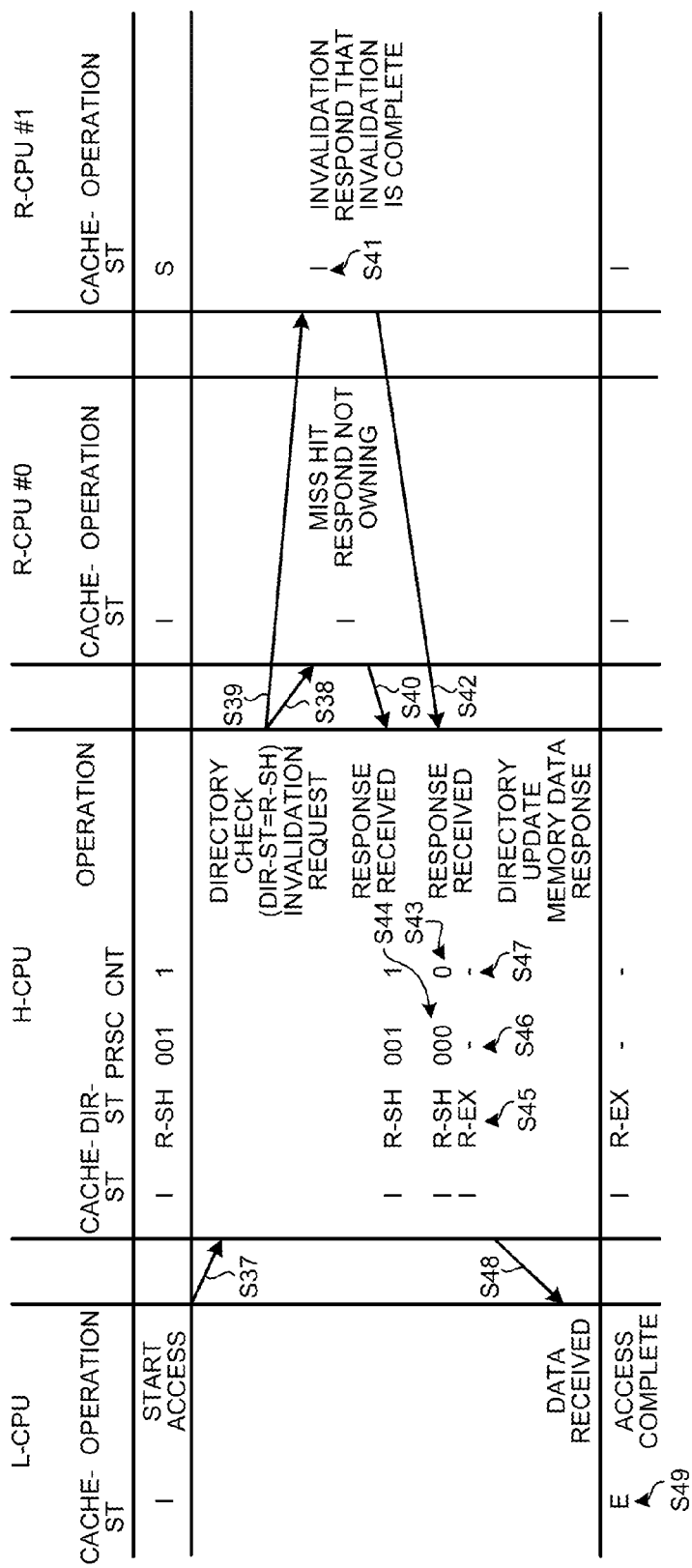
FIG. 15 is a view illustrating an example of processing operations upon exclusive fetch access.

FIG. 15 is a view illustrating an example of processing operations upon exclusive fetch access. In FIG. 15, a description will be given, as a specific example, of the case where the directory state is "R-SH" indicating that data is shared by cache memories of other CPUs in a clean state, the cache states of the L-CPU, the H-CPU, and the R-CPU #0 are "I" indicating that the data held in the L2 cache 23a is invalid, respectively, and the cache state of the R-CPU #1 is "S" indicating to be a shared type that data is shared with cache memories of other CPUs, and that the held data is in a clean state. Here, given as an example is the case where the presence bit is managed in units of four CPUs, and the R-CPUs #0 and #1 belong to the same group as the management unit of the presence bit. Moreover, here, for convenience of description, of CPUs belonging to the same group, only the R-CPUs #0 and #1 are illustrated, and a description will be omitted of the other CPUs except the R-CPUs #0 and #1. Moreover, here, the L-CPU, the H-CPU, and the R-CPUs #0 and #1 are assumed to belong to different groups, respectively, as the management units of the presence bits.

The L-CPU requests exclusive fetch access from the H-CPU (Step S37). Next, the H-CPU determines to respond to the L-CPU with the data read from the memory 10, similarly to FIG. 14. Moreover, in this case, the directory analysis unit 52 directs the R-CPUs #0 and #1 that belong to the same group owning the data to invalidate the cache state of the target data of the exclusive fetch access (Steps S38 and S39).

The R-CPU #0 has a cache miss and responds to the H-CPU that the target data of the exclusive fetch access is not included (Step S40). Moreover, the R-CPU #1 updates the cache state to "I" indicating that the data held in the L2 cache 23a is invalid (Step S41), and responds to the H-CPU that invalidation is complete (Step S42).

The H-CPU then receives responses from the R-CPUs #0 and #1. If receiving the invalidation complete response from the R-CPU #1, the H-CPU updates the directory information.

For example, the directory analysis unit 52 receives the invalidation complete response from the R-CPU #1 and sets the "CPU count (CNT)" to "0" from "1" (Step S43). Consequently, the "CPU count (CNT)" indicates that no CPU includes the target data of the exclusive fetch access target.

Moreover, after receipt of the responses from the R-CPUs #0 and #1, the directory analysis unit 52 of the H-CPU sets the "presence bit (PRSC)" (Step S44). For example, if associating the bits of PRSC with the "groups to which the L-CPU, the H-CPU, and the R-CPUs #0 and #1 belong," the directory analysis unit 52 changes the "presence bits" from "001" to "000." Consequently, the "presence bits" indicate that the group to which the R-CPUs #0 and #1 does not hold the target data of the exclusive fetch access. Here, the number of the received invalidation complete responses, "1", agrees with the number of the CPU count before the invalidation process, "1"; accordingly, the "CPU count" after receipt of the invalidation complete responses becomes "0". In this case, the directory analysis unit 52 of the H-CPU ends the invalidation process normally.

The H-CPU then sets the "directory state" to "R-EX" indicating that data is exclusively held only in the cache memory of the L-CPU and may be dirty (Step S45). Moreover, the H-CPU invalidates the "presence bit" and the "CPU count" (Steps S46 and S47). Next, the H-CPU responds to the L-CPU with the target data of the exclusive fetch access (Step S48).

The L-CPU receives the target data of the exclusive fetch access. The L-CPU then updates the cache state to "E" indicating to be an exclusive type that is indicative of an exclusive state where data is not held in a cache memory of any other CPU, and that the held data is in a clean state (Step S49).

Abnormality Detection upon Exclusive Fetch Access in Case of R-SH

Figure 16:
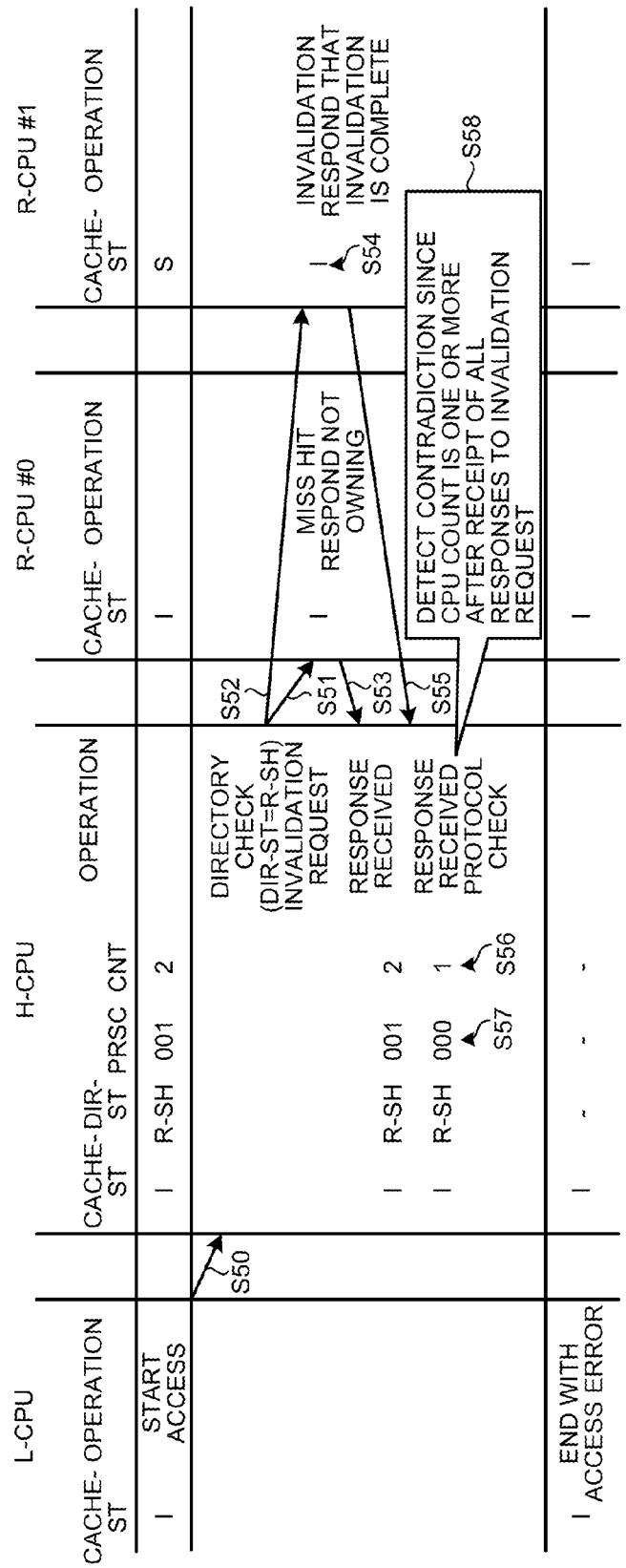
FIG. 16 is a view illustrating an example of processing operations upon exclusive fetch access.

FIG. 16 is a view illustrating an example of processing operations upon exclusive fetch access. In FIG. 16, a description will be given, as a specific example, of the case where the directory state is "R-SH" indicating that data is shared by cache memories of other CPUs in a clean state, the cache states of the L-CPU, the H-CPU and the R-CPU #0 are "I" indicating that the data held in the L2 cache 23a is invalid, respectively, and the cache state of the R-CPU #1 is "S" indicating to be a shared type that data is shared with cache memories of other CPUs, and that the held data is in a clean state. Moreover, here, given as an example is the case where the target data of the exclusive fetch access is included in one CPU, however, the CPU count is set to "2" incorrectly. Here, given as an example is the case where the presence bit is managed in units of four CPUs, and the R-CPUs #0 and #1 belong to the same group as the management unit of the presence bit. Moreover, here, for convenience of description, of CPUs belonging to the same group, only the R-CPUs #0 and #1 are illustrated, and a description will be omitted of the other CPUs except the R-CPUs #0 and #1. Moreover, here, the L-CPU, the H-CPU, and the R-CPUs #0 and #1 are assumed to belong to different groups, respectively, as the management units of the presence bits.

Similarly to FIG. 14, the H-CPU receives the exclusive fetch access from the L-CPU (Step S50), and determines to respond to the L-CPU with the data read from the memory 10. Moreover, in this case, the directory analysis unit 52 of the H-CPU directs the R-CPUs #0 and #1 that belong to the same group owning the data to invalidate the cache state of the target data of the exclusive fetch access (Steps S51 and S52).

The R-CPU #0 has a cache miss and responds to the H-CPU that the target data of the exclusive fetch access is not included (Step S53). Moreover, the R-CPU #1 invalidates the cache state (Step S54), and responds to the H-CPU that invalidation is complete (Step S55).

The H-CPU receives responses from the R-CPUs #0 and #1. If receiving the response from the R-CPU #1, the H-CPU updates the directory information. For example, the directory analysis unit 52 of the H-CPU receives the invalidation complete response from the R-CPU #1 and sets the "CPU count (CNT)" to "1" from "2" (Step S56). Consequently, the "CPU count (CNT)" indicates that one CPU includes the target data of the exclusive fetch access.

Moreover, after receipt of the responses from the R-CPUs #0 and #1, the directory analysis unit 52 of the H-CPU sets the "presence bits (PRSC)" (Step S57). For example, if associating the bits of PRSC with the "groups to which the L-CPU, the H-CPU, and the R-CPUs #0 and #1 belong," the directory analysis unit 52 changes the "presence bits" from "001" to "000." Consequently, the "presence bits" indicate that the group to which the R-CPUs #0 and #1 belong does not hold the target data of the exclusive fetch access target.

Here, the number of the received invalidation complete responses, "1", does not agree with the number of the CPU count before the invalidation process, "2". Consequently, the CPU count after receipt of the invalidation response becomes "1". In this case, the directory analysis unit 52 of the H-CPU detects that a contradiction arises in the CPU count after the invalidation process (Step S58). As a result, in the H-CPU, a protocol check is executed and the L-CPU ends with an access error.

Restoration Process in Case of R-SH

Figure 17:
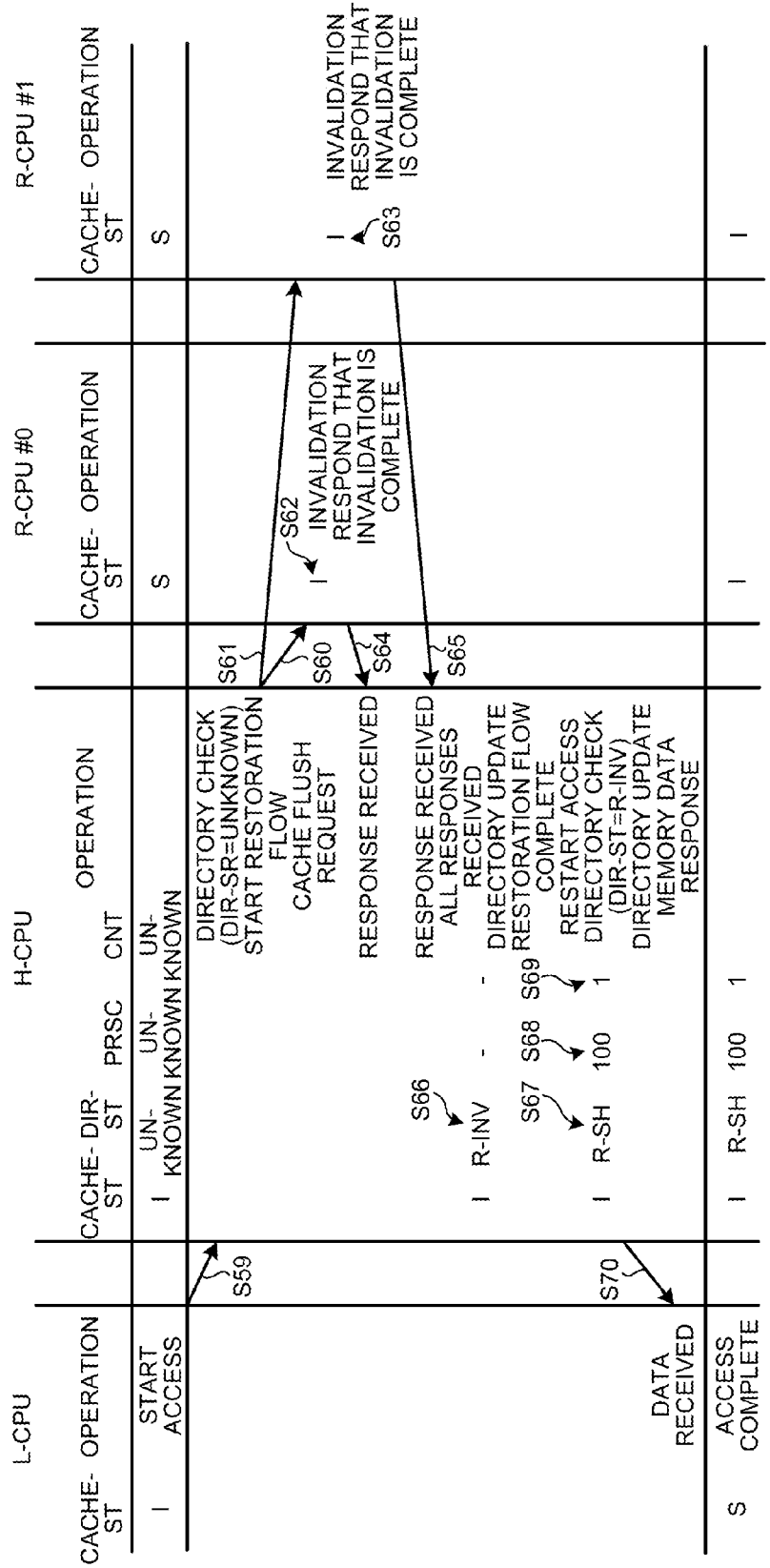
FIG. 17 is a view illustrating an example of processing operations of a restoration process of when the directory information is lost.

FIG. 17 is a view illustrating an example of processing operations of a restoration process of when the directory information is lost. In FIG. 17, a description will be given of processing operations of a restoration process of when the directory information is lost. Here, a description will be given, as a specific example, of the case where the cache states of the L-CPU and the H-CPU are "I" indicating that the data held in the L2 cache 23a is invalid, respectively, and the cache states of the R-CPUs #0 and #1 are "S" indicating to be a shared type that data is shared with cache memories of other CPUs, and that the held data is in a clean state, respectively. Here, given as an example is the case where the presence bit is managed in units of four CPUs, and the R-CPUs #0 and #1 belong to the same group as the management unit of the presence bit. Moreover, here, for convenience of description, of CPUs belonging to the same group, only the R-CPUs #0 and #1 are illustrated, and a description will be omitted of the other CPUs except the R-CPUs #0 and #1. Moreover, here, the L-CPU, the H-CPU, and the R-CPUs #0 and #1 are assumed to belong to different groups, respectively, as the management units of the presence bits.

The H-CPU receives instruction fetch access from the L-CPU (Step S59). Here, as a result of the directory check, the H-CPU determines that the directory information is lost and starts a restoration flow. The H-CPU then requests all the CPUs in the information processing system to flush the cache. Here, for example, as all the CPUs in the information processing system, the R-CPUs #0 and #1 other than the L-CPU that requests the instruction fetch access are requested to flush the cache (Steps S60 and S61).

The R-CPUs #0 and #1 invalidate the cache states held in a clean state (Steps S62 and S63), and responds that invalidation is complete (Steps S64 and S65). Next, after receipt of all responses, the H-CPU restores the directory information. For example, the directory analysis unit 52 sets the directory state to "R-INV" indicating not to be held in a cache memory of any other CPU (Step S66).

Next, the H-CPU restarts the instruction fetch access by the L-CPU. For example, the directory analysis unit 52 sets the "directory state" to "R-SH" indicating that data is held in cache memories of other CPUs in a clean state (Step S67).

Moreover, the directory analysis unit 52 of the H-CPU sets the "presence bits (PRSC)" (Step S68). For example, if associating the bits of PRSC with the "groups to which the L-CPU, the H-CPU, and the R-CPUs #0 and #1 belong," the directory analysis unit 52 sets the "presence bits" to "100." Consequently, the "presence bits" indicate that the group to which the L-CPU belongs holds the target data of the fetch access.

Moreover, the directory analysis unit 52 of the H-CPU sets the "CPU count (CNT)" to "1" (Step S69). Consequently, the "CPU count (CNT)" indicates that one CPU includes the target data of the fetch access. The H-CPU then responds with the target data of the instruction fetch access from the memory 10 (Step S70).

Restoration Process in Case of R-EX

Figure 18:
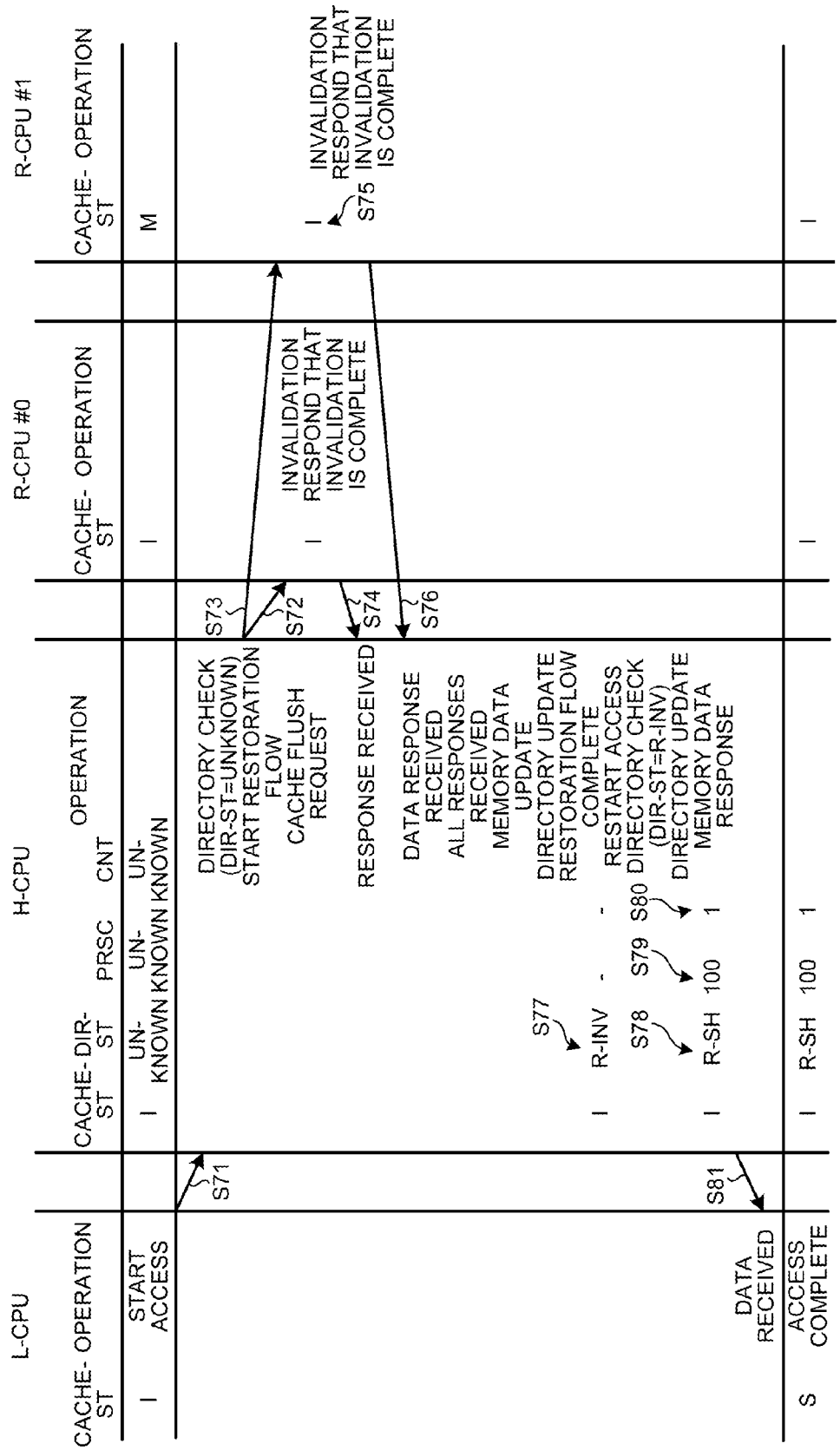
FIG. 18 is a view illustrating an example of processing operations of a restoration process of when the directory information is lost.

FIG. 18 is a view illustrating an example of processing operations of a restoration process of when the directory information is lost. In FIG. 18, a description will be given, as a specific example, of the case where the cache states of the L-CPU, the H-CPU, and the R-CPU #0 are "I" indicating that the data held in the L2 cache 23a is invalid, respectively, and the cache state of the R-CPU #1 is "M" indicating to be an exclusive type that is indicative of an exclusive state where data is not held in a cache memory of any other CPU, and that the held data is in a dirty state. Here, given as an example is the case where the presence bit is managed in units of four CPUs, and the R-CPUs #0 and #1 belong to the same group as the management unit of the presence bit. Moreover, here, for convenience of description, of CPUs belonging to the same group, only the R-CPUs #0 and #1 are illustrated, and a description will be omitted of the other CPUs except the R-CPUs #0 and #1. Moreover, here, the L-CPU, the H-CPU, and the R-CPUs #0 and #1 are assumed to belong to different groups, respectively, as the management units of the presence bits.

Similarly to FIG. 17, the H-CPU receives instruction fetch access from the L-CPU (Step S71), determines that the directory information is lost as a result of the directory check, and restarts a restoration flow. For example, similarly to FIG. 17, as all the CPUs in the information processing system, the H-CPU requests the R-CPUs #0 and #1 to flush the cache (Steps S72 and S73).

Moreover, the R-CPU #0 invalidates the cache state held in a clean state and responds that invalidation is complete (Step S74). Moreover, the R-CPU #1 invalidates the cache state held in a dirty state (Step S75), and transfers the data to the H-CPU (Step S76). Next, after receipt of all responses, the H-CPU restores the directory information. For example, the directory analysis unit 52 sets the directory state to "R-INV" indicating not to be held in a cache memory of any other CPU (Step S77).

Next, the H-CPU restarts the instruction fetch access by the L-CPU. For example, the directory analysis unit 52 sets the "directory state" to "R-SH" (Step S78).

Moreover, the directory analysis unit 52 of the H-CPU sets the "presence bit (PRSC)" (Step S79). For example, if associating the bits of PRSC with the "groups to which the L-CPU, the H-CPU and the R-CPUs #0 and #1 belong," the directory analysis unit 52 sets the "presence bits" to "100." Consequently, the "presence bits" indicate that the group to which the L-CPU belongs holds the target data of the fetch access.

Moreover, the directory analysis unit 52 of the H-CPU sets the "CPU count (CNT)" to "1" (Step S80). Consequently, the "CPU count (CNT)" indicates that one CPU includes the target data of the fetch access. The H-CPU then responds with the target data of the instruction fetch access from the memory 10 (Step S81).

Processing Procedure of Processes by Operation Determination Unit According to First Embodiment Next, a description will be given of a processing procedure of directory check processes of exclusive fetch access by the operation determination unit 45 according to the first embodiment with reference to FIG. 19. FIG. 19 is a flowchart for explaining a processing procedure of the directory check processes of exclusive fetch access by the operation determination unit according to the first embodiment. As illustrated in FIG. 19, taking the opportunity of receipt of the directory information from the read data receiving unit 44, the operation determination unit 45 starts the directory check of exclusive fetch access.

In the operation determination unit 45, the directory analysis unit 52 determines whether or not the directory state indicating the state of the directory is INV indicating not to be held in a cache memory of any other CPU (Step S101). Here, if the directory analysis unit 52 determines that the directory state is INV indicating not to be held in a cache memory of any other CPU (Step S101, Yes), the data response activation unit 53 executes the following process. In other words, the data response activation unit 53 reads read data from the data buffer 41 (Step S102), and responds to the data response unit 34 with the read data (Step S103).

Moreover, if determining that the directory state indicating the state of the directory indicates a directory state other than INV (Step S101, No), the directory analysis unit 52 determines whether or not the directory state is EX indicating to be held in a cache memory of a single CPU and the possibility of being dirty (Step S104). Here, if the directory analysis unit 52 determines that the directory state is EX indicating to be held in a cache memory of a single CPU and the possibility of being dirty (Step S104, Yes), the command issuance activation unit 54 executes the following process. In other words, the command issuance activation unit 54 issues a cache access command to a CPU holding the data that may be dirty (Step S105). Here, the command issuance activation unit 54 identifies the CPU that holds the data from the CPU-ID.

Moreover, if the directory analysis unit 52 determines that the directory state indicates a directory state other than EX (Step S104, No), the command issuance activation unit 54 executes the following process. In other words, the command issuance activation unit 54 reads a mode register to determine whether or not the management unit of the presence bit is per CPU (Step S106).

Here, if the management unit of the presence bit is per CPU (Step S106, Yes), the command issuance activation unit 54 identifies a CPU that holds the data from the presence bit and issues an invalidation command to invalidate the held data to the CPU holding the data that may be dirty (Step S107). On the other hand, if the management unit of the presence bit is not per CPU (Step S106, No), the command issuance activation unit 54 identifies a CPU group that includes a CPU holding the data that may be dirty from the presence bit, and issues an invalidation command to the identified CPU group (Step S108).

Effects of First Embodiment

As have been described above, the CPU 20 according to the first embodiment writes to the memory the presence or absence of a CPU that holds the same data block as data stored in the memory in its cache memory as directory information, for every predetermined number of CPUs. As a result, the CPU 20 according to the first embodiment can suppress increase in the amount of directory information in accordance with increase in the number of CPUs.

Moreover, the CPU 20 according to the first embodiment can expand the scale of the information processing apparatus, since it is possible to handle the large-scale configuration with a certain amount of information by a presence bit that can change the management unit, for example.

Moreover, the CPU 20 according to the first embodiment can identify a CPU group that does not own accessed data and suppress unnecessary data communication to an irrelevant CPU by referring to a presence bit even if access to an arbitrary data block occurs upon large-scale configuration.

Moreover, the CPU 20 according to the first embodiment manages a CPU count. Therefore, if all CPUs in the system abandon an arbitrary data block in the management of a presence bit in units of CPU groups upon large-scale configuration, the CPU 20 according to the first embodiment can detect that the directory state has returned to R-INV indicating that data is not held in a cache memory of any other CPU. Therefore, regardless of a fact that data is not owned by a cache of any CPU, the CPU 20 according to the first embodiment can suppress unnecessary data communication, compared with a case where the cache state is kept to R-SH indicating that data is shared by cache memories of other CPUs in a clean state, if the data held in the cache memory of the CPU is reaccessed.

Moreover, the CPU 20 according to the first embodiment manages a presence bit in units of CPU groups upon large-scale configuration. Therefore, the CPU 20 according to the first embodiment can check a contradiction in the registration state in a cache in a CPU, the contradiction arising due to failure and the like, from the CPU count, if all CPUs that own an arbitrary data block are accessed. As a result, the CPU 20 according to the first embodiment can realize both of the security of reliability and improvement in performance. Furthermore, the CPU 20 according to the first embodiment is equipped with the restoration flow even if the directory information is lost, and accordingly can secure reliability.

[B] Second Embodiment

The present invention may be embodied in various modes other than the above embodiment. Hence, a description will be given of another embodiment included in the present invention in a second embodiment.

System Configuration and the Like

It is possible to manually perform all or part of the processes that have been described assuming that they are automatically performed among the processes described in the embodiment. Otherwise, it is also possible to automatically perform all or part of the processes that have been described assuming that they are manually performed in a known method. In addition, it is possible to arbitrarily change the processing procedures, control procedures and specific names stated in the above texts and drawings unless otherwise specified.

Moreover, the directory information has been described as one that is mapped on the memory, however, a memory dedicated for the directory information may be provided in a CPU. Moreover, it is possible that a "CPU count" is not managed if the management unit of a presence bit is per CPU, in other words, one bit is allocated to one CPU.

Moreover, the illustrated constituents are functionally conceptual and are not necessarily physically configured as illustrated. For example, in the CPU 20, the command issuance activation unit 54 and the command destination determination unit 55 may be integrated. Furthermore, all or arbitrary part of processing functions performed by apparatuses can be realized by a CPU and a program to be analyzed and executed by the CPU, or can be realized as hardware by wired logic.

It is possible to suppress increase in the amount of directory information even if the number of central processing units increases.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A central processing unit connected to a main memory among a plurality of central processing units each comprising a cache memory, the central processing unit comprising a control unit that executes a process comprising:
classifying the plurality of central processing units into a first predetermined number that is set based on a total number of the plurality of central processing units upon activation of the central processing unit;
writing presence information to the main memory indicating a presence or absence of a central processing unit holding the same data block as part of data stored in the main memory in a cache memory included in any of the central processing units that belong to a corresponding central processing unit group, for each central processing unit group of a plurality of central processing unit groups obtained at the classifying; and changing a unit number information indicating a number of the central processing unit for management of the presence information from the first predetermined number of central processing units to a second predetermined number of central processing units among the plurality of central processing units.

2. A method of controlling a central processing unit connected to a main memory for storing data and a plurality of central processing units, the method comprising:

holding a data block being part of data in a cache memory included in the own unit;

classifying the plurality of central processing units into a first predetermined number that is set based on a total number of the plurality of central processing units upon activation of the central processing unit;

writing presence information to the main memory indicating a presence or absence of a central processing unit holding the same data block as part of data stored in the main memory in a cache memory included in any of the central processing units that belong to a corresponding central processing unit group, for each central processing unit group of a plurality of central processing unit groups obtained at the classifying; and changing a unit number information indicating a number of the central processing unit for management of the presence information from the first predetermined number of central processing units to a second predetermined number of central processing units among the plurality of central processing units.

3. An information processing apparatus comprising a main memory for storing data, a central processing unit connected to the main memory, and a plurality of central processing units connected to the central processing unit, the central processing unit comprising:

a cache memory that holds a data block being a part of data; and a control unit, wherein the control unit executes a process comprising:

classifying the plurality of central processing units into a first predetermined number that is set based on a total number of the plurality of central processing units upon activation of the information processing apparatus;

writing presence information to the main memory indicating a presence or absence of a central processing unit holding the same data block as part of data stored in the main memory in a cache memory included in any of the central processing units that belong to a corresponding central processing unit group, for each central processing unit group of a plurality of central processing unit groups obtained at the classifying; and changing a unit number information indicating a number of the central processing unit for management of the presence information from the first predetermined number of central processing units to a second predetermined number of central processing units among the plurality of central processing units.

4. The central processing unit according to claim 1, wherein the control unit executes a process further comprising writing to the main memory count information displaying the number of central processing units holding the presence information indicating presence of the same data block among the plurality of central processing units.

5. The central processing unit according to claim 4, wherein the control unit executes a process further comprising:

requesting of a central processing unit holding the same data block as data corresponding to the request in a cache memory among the plurality of the central processing units other than the central processing unit, invalidation of the same data block and a response to the effect to have hold the same data block, when receiving of a request to exclusively hold data from any of the plurality of the other central processing units, and determining that the presence information and the count information, which has been written to the main memory, is both abnormal, when a number of received responses disagreeing with the count information written to the main memory.

6. The central processing unit according to claim 5, wherein the control unit executes a process further comprising setting the count information written to the main memory to "0", when the number of received responses agreeing with the count information written to the main memory.

* * * * *